(12) United States Patent
Mitsutake

(10) Patent No.: US 8,171,082 B2
(45) Date of Patent: May 1, 2012

(54) INFORMATION PROCESSING SYSTEM, INFORMATION PROCESSING METHOD AND COMPUTER READABLE MEDIUM

(75) Inventor: Katsuya Mitsutake, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 523 days.

(21) Appl. No.: 12/048,993

(22) Filed: Mar. 14, 2008

(65) Prior Publication Data

US 2009/0006168 A1   Jan. 1, 2009

(30) Foreign Application Priority Data

Jun. 29, 2007  (JP) ................................ 2007-172596

(51) Int. Cl.
  *G06F 15/16*  (2006.01)
(52) U.S. Cl. ........................................ 709/205; 358/540
(58) Field of Classification Search .................... 715/964
  See application file for complete search history.

(56) References Cited

U.S. PATENT DOCUMENTS

| 6,292,709 | B1 * | 9/2001 | Uhl et al. ...................... 700/226 |
| 7,130,775 | B2 * | 10/2006 | Takagaki et al. .................. 703/1 |
| 7,293,234 | B2 * | 11/2007 | Silverbrook et al. ......... 382/187 |
| 7,424,236 | B2 * | 9/2008 | Inoue et al. ...................... 399/81 |
| 2001/0052995 | A1 * | 12/2001 | Idehara .......................... 358/1.15 |
| 2002/0168090 | A1 * | 11/2002 | Bruce et al. .................... 382/101 |
| 2006/0045321 | A1 * | 3/2006 | Yu ................................ 382/137 |
| 2006/0203314 | A1 * | 9/2006 | Onishi ........................... 358/540 |
| 2006/0279762 | A1 * | 12/2006 | Onishi .......................... 358/1.14 |
| 2007/0050378 | A1 * | 3/2007 | Kasatani ......................... 707/10 |
| 2007/0133907 | A1 * | 6/2007 | Yamamoto et al. ........... 382/305 |
| 2008/0044086 | A1 * | 2/2008 | Itoh et al. ....................... 382/195 |

FOREIGN PATENT DOCUMENTS

| JP | 10-320341 A | 12/1998 |
| JP | 10-320342 A | 12/1998 |
| JP | 10-320344 A | 12/1998 |
| JP | 2006-254299 A | 9/2006 |
| JP | 2006-277603 A | 10/2006 |

* cited by examiner

*Primary Examiner* — Bunjob Jaroenchonwanit
(74) *Attorney, Agent, or Firm* — Sughrue Mion, PLLC

(57) ABSTRACT

An information processing system includes: a room specifying unit that specifies a room; an equipment coordinate storing unit that stores a correspondence between the room and a placing location of an information processing equipment equipped in the room; a document specifying unit that specifies a paper document on the basis of an information image recited on the paper document; a coordinate information extracting unit that extracts coordinate information from the paper document; a document information extracting unit that extracts document information regarding the stored paper document; an equipment specifying unit that specifies the stored information processing equipment on the basis of room information specified by the room specifying unit and the coordinate information extracted by the coordinate information extracting unit; and an outputting unit that outputs the document information specified by the coordinate information extracting unit to the information processing equipment specified by the equipment specifying unit.

11 Claims, 21 Drawing Sheets

FIG. 11A  FIG. 11B  FIG. 11C  FIG. 11D
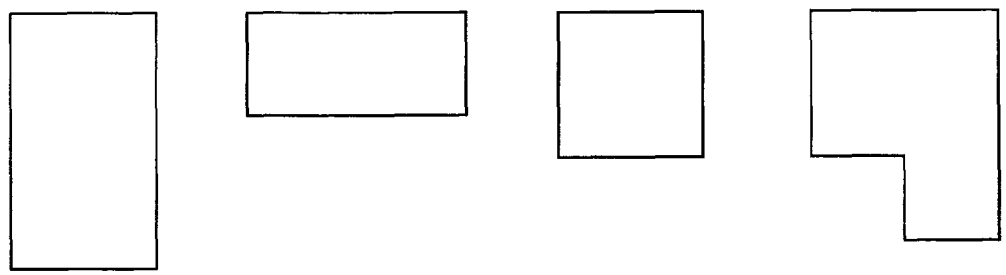
FIG. 11E  FIG. 11F
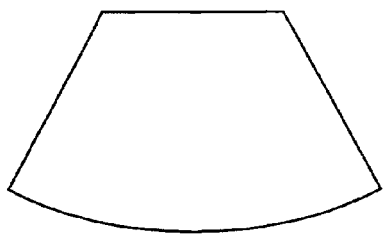
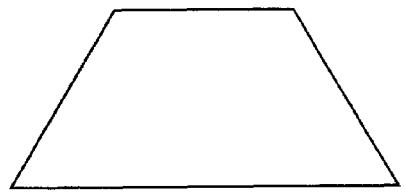
FIG. 11G  FIG. 11H
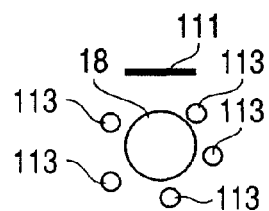
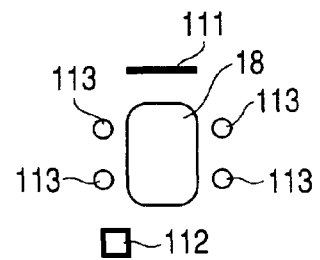
FIG. 11I  FIG. 11J  FIG. 11K
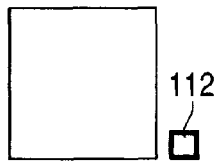
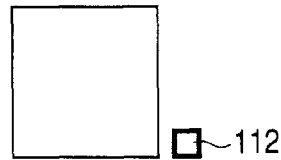
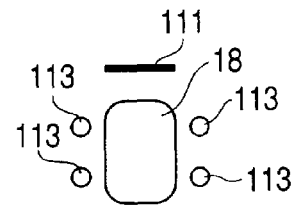

FIG. 15 a; o_id1; b; c; d; a, o_id1 (address1; protocol1)

FIG. 16 a; o_id1; o_id2 ; b; c; d; a, o_id1 (address1; protocol1; parameter1); o_id2 (address2; protocol2)

FIG. 17 a; o_id1; b; c; o_id2; d; o_id3; a, o_id1 (address1; protocol1; parameter1); o_id2 (address2; protocol2) ); o_id3 (address3; protocol3)

FIG. 18 a; o_id1; b ; c; o_id2; d; a, o_id1 (address1; protocol1; parameter1); o_id2 (address2; protocol2) )

FIG. 19 a; o_id1; o_id2 ; b; c; o_id3; o_id4; o_id5; d; a, o_id1 (address1; protocol1; parameter1); o_id2 (address2; protocol2); o_id3 (address3; protocol3); o_id4 (address4; protocol4); o_id5 (address5; protocol5)

FIG. 20 a; o_id1; o_id2 ; b; o_id3; c; d; o_id4; a, o_id1 (address1; protocol1; parameter1); o_id2 (address2; protocol2); o_id3 (address3; protocol3); o_id4 (address4; protocol4)

FIG. 21 a; b; o_id1 ; c; o_id2 ; d; a, o_id1 (address1; protocol1; parameter1); o_id2 (address2; protocol2)

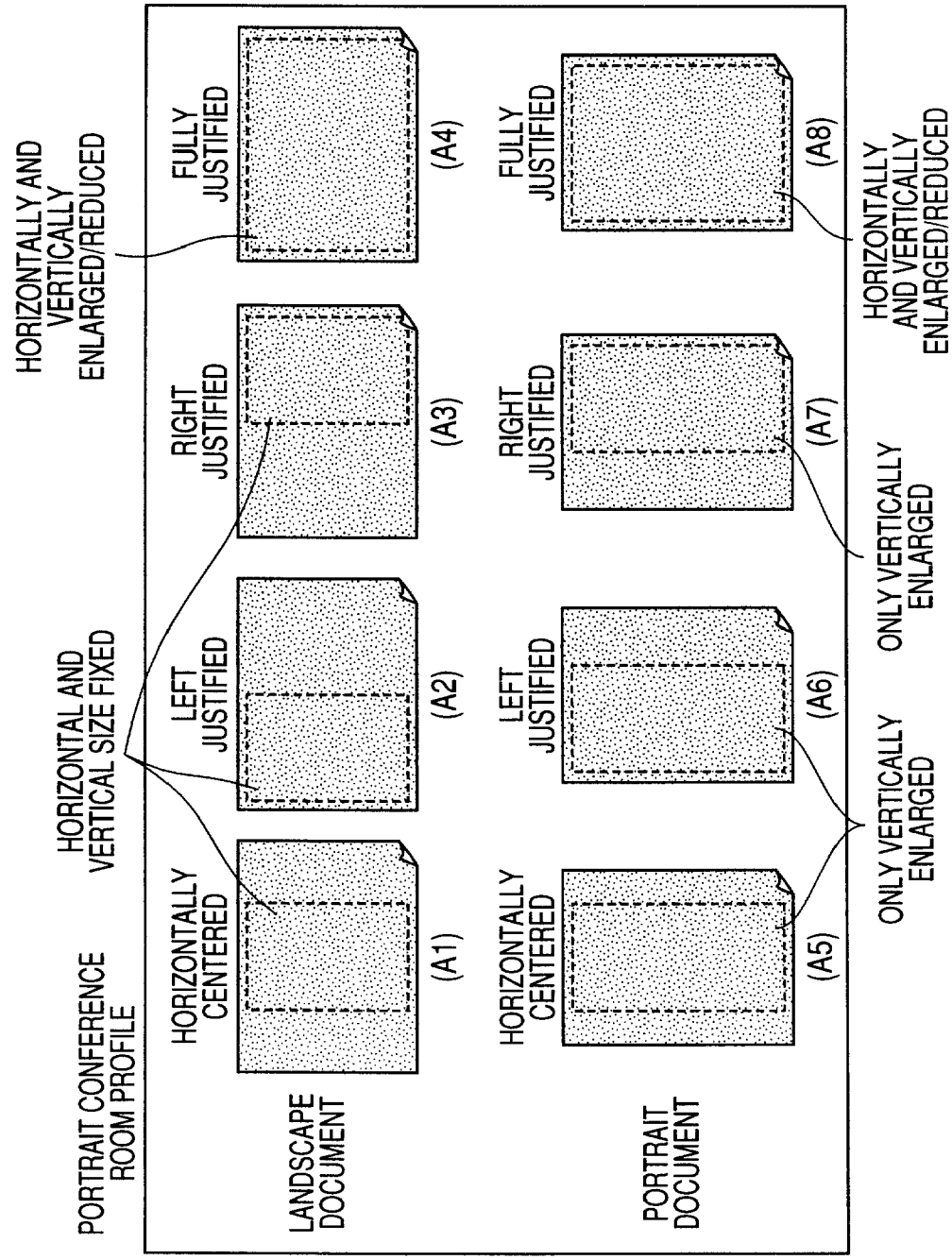

FIG. 25
a; ab:o_id1; b; bc; c:o_id2; cd; d; da; , o_id1 (address1; protocol1); o_id2 (address2; protocol2)
FIG. 26
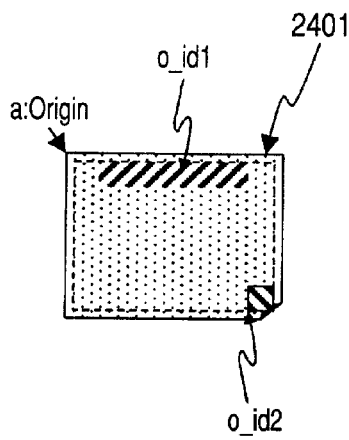
FIG. 27A
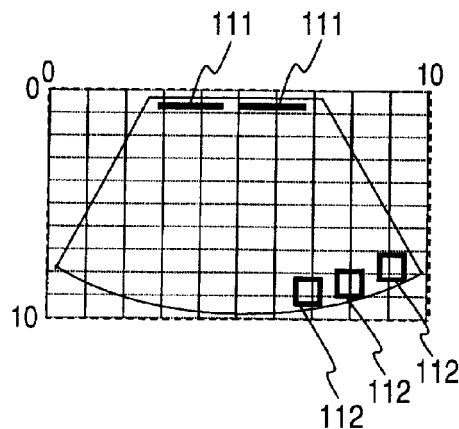
FIG. 27B
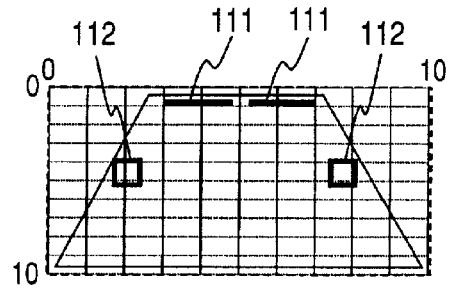
FIG. 28
(3-5,0-1):o_id1; (5-7,0-1):o_id2 ; (9-10,7-8):o_id3; (8-9,8-9):o_id4 ; (7-8,9-10):o_id5, o_id1 (address1; protocol1; parameter1); o_id2 (address2; protocol2); o_id3 (address3; protocol3); o_id4 (address4; protocol4); o_id5 (address5; protocol5)
FIG. 29
(3-5,0-1):o_id1; (5-7,0-1):o_id2 ; (8-9,4-5):o_id3; (1-2,4-5):o_id4, o_id1 (address1; protocol1; parameter1); o_id2 (address2; protocol2); o_id3 (address3; protocol3); o_id4 (address4; protocol4)

INFORMATION PROCESSING SYSTEM, INFORMATION PROCESSING METHOD AND COMPUTER READABLE MEDIUM

CROSS-REFERENCE TO RELATED APPLICATIONS

This application is based on and claims priority under 35 U.S.C. 119 from Japanese Patent Application No. 2007-172596 filed Jun. 29, 2007.

BACKGROUND

1. Technical Field

The present invention relates to an information processing system, an information processing method and a computer readable medium.

2. Related Art

In such a conference system that a plurality of conferees proceed with the conference while sharing the contents of the electronic document displayed on the board-type display or printed by the printer, the conferees must operate the user interface (UI, User Interface) to display/print the shared electronic document. In the operation of the user interface, at least the designation of the concerned electronic document and the designation of the output destination (the board-type display or the printer) are needed. Conventionally procedures of displaying a list of electronic documents and choosing the concerned electronic document and page are done to designate the electronic document. Also, procedures of displaying a list of output destinations, choosing the concerned output destination, and correlating the electronic document are done to designate the output destination.

SUMMARY

According to an aspect of the present invention, an information processing system including: a room specifying unit that specifies a room; an equipment coordinate storing unit that stores a correspondence between the room and a placing location of an information processing equipment equipped in the room; a document specifying unit that specifies a paper document on the basis of an information image recited on the paper document; a coordinate information extracting unit that extracts coordinate information from the paper document; a document information extracting unit that extracts document information regarding the paper document specified by the document specifying unit; an equipment specifying unit that specifies the information processing equipment stored in the equipment coordinate storing unit on the basis of room information specified by the room specifying unit and the coordinate information extracted by the coordinate information extracting unit; and an outputting unit that outputs the document information specified by the coordinate information extracting unit to the information processing equipment specified by the equipment specifying unit.

BRIEF DESCRIPTION OF THE DRAWINGS

Exemplary embodiment of the present invention will be described in detail based on the following figures, wherein:

FIGS. 11A to 11K are explanatory views showing an example of a conference room;

FIG. 15 is an explanatory view showing an example of registration information of conference rooms A and G;

FIG. 16 is an explanatory view showing an example of registration information of a conference room B;

FIG. 17 is an explanatory view showing an example of registration information of a conference room C;

FIG. 18 is an explanatory view showing an example of registration information of conference rooms D and H;

FIG. 19 is an explanatory view showing an example of registration information of a conference room E;

FIG. 20 is an explanatory view showing an example of registration information of a conference room F;

FIG. 21 is an explanatory view showing an example of registration information of a conference room I;

FIGS. 23A and 23B are explanatory views showing an example that conference room profiles are assigned to a display medium;

FIG. 25 is an explanatory view showing an example of registration information of the conference room D;

FIG. 26 is an explanatory view showing an example of the coordinate region of the conference room D;

FIGS. 27A and 27B are explanatory views showing an example of coordinate information of the conference rooms E and F;

FIG. 28 is an explanatory view showing an example of the coordinate region of the conference room E;

FIG. 29 is an explanatory view showing an example of the coordinate region of the conference room F;

DETAILED DESCRIPTION

Examples of various preferred embodiments in implementing the present invention will be explained with reference to the drawings hereinafter.

Figure 1:
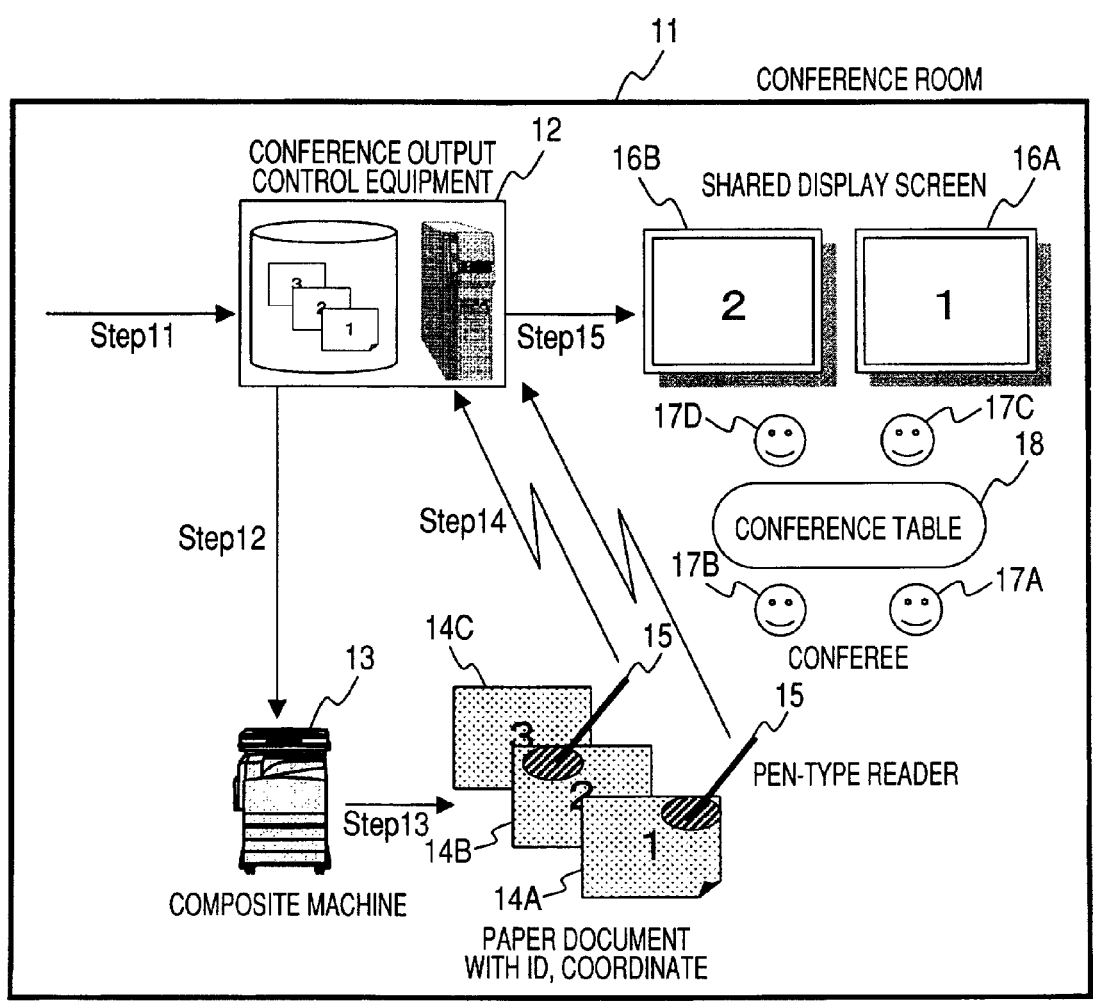
FIG. 1 is a conceptual module configurative view explaining a configurative example of a first embodiment including an application mode example.

FIG. 1 shows a conceptual module configurative view of a configurative example of an information processing system of a first embodiment including an application mode example.

Here, commonly the module means the component of software (computer program), hardware, etc. that is logically separable. Therefore, the module in the present embodiment indicates not only the module in the computer program but also the module in the hardware configuration. For this reason, the explanation of the present embodiment is commonly applied to the computer program, the system, and the method. In this case, for convenience of explanation, "store", "cause to store", and wordings equivalent to them are employed. However, these wordings means "to control to store in the memory" when the embodiment corresponds to the computer program. Also, the module corresponds to the function substantially on a one-to-one basis. In the implementation, one module may be constructed by one program, a plurality of modules may be constructed by one program, or conversely one module may be constructed by a plurality of programs. Also, a plurality of modules may be executed by one computer, or one module may be executed by a plurality of computers in the distributed or parallel environment. Here, other modules may be contained in one module. Also, in the following explanation, the "connection" contains logical connections (data transfer, instruction, reference between data, and the like) as well as the physical connection.

Also, the system and the equipment may constructed by connecting a plurality of computers, hardwares, equipments, or the like via the communication means such as the network (containing the peer-to-peer communication connection), and the like. In addition, the case where the system and the equipment is constructed by one computer, hardware, equipment, or the like may be contained.

The present embodiment is employed when a plurality of persons gather to talk with each other, or the like. For example, the present embodiment is employed in the conference, the meeting, and the like, and the conference will be explained mainly by way of example hereunder. Also, there are a conference room, an announce hall, a lecture hall, a schoolroom, a hall, etc. as a concrete example of the room where a plurality of persons gather. The conference room will be explained mainly as an example. Here, the conference room means a space/location where the conference is held, and is not restricted to the space/location that is partitioned by the door, the wall, and the like.

Also, the information processing equipment that is able to process the document is provided in the conference room. For example, a large-screen display, a translating equipment, etc. are provided thereto to share the contents of the same document with a plurality of persons. The processing operations of the document contain the display operation on the display, the translation operation, and the like. Mainly the case where the document is output on the large-screen display will be explained by way of example hereinafter.

Here, the document is given in the form of the text and the electronic data such as image, moving picture, sound, and the like as the case may be. That is, the document is the unit of the named structural body that can be stored, edited, searched, etc. and can be transferred between the systems or the users as the individual unit. The materials similar to them are contained in the document. Also, sometimes the electronic document and data constituting the document are referred to as document data when they should be contrasted particularly with a paper document.

Also, the paper document means a paper-like medium to which contents of the document are output. The paper-like medium contains a paper, a plastic, an electronic paper as a thin display medium, and the like. Hereinafter explanation will be made mainly by taking the paper display medium as an example.

First, an outline of the present embodiment will be explained hereunder.

The physical position of the output equipment in the conference room (including the conference room and the putting place in the conference room) is converted into the coordinate of the document medium (containing the paper document, the display device, and the like) by the mapping. Then, the coordinate pointed by the user (sometimes also called the operator or the conferee hereinafter) on the document medium is read, and the corresponding document is output to the output equipment in the conference room being mapped on the coordinate. Here, the "mapping" used herein is to correlate the physical position of the output equipment with the coordinate on the document medium, i.e., either to specify the output equipment existing on the corresponding physical position from the coordinate on the document medium or conversely to derive the coordinate on the corresponding document medium from the physical position of the output equipment.

In the following, the coordinate signifies the coordinate in the document displayed on the document medium unless mentioned particularly.

Next, an example of an application mode in an actual using scene of the present embodiment will be explained with reference to FIG. 1 hereunder. A conference room 11 in which two monitoring displays 16A and 16B for the document are hung on a wall and a composite machine 13 (an image processing equipment having two functions or more out of a scanner, a printer, a copying machine, a facsimile, and the like. Herein this composite machine has a printer function.) is provided is cited as an instance. In this case, the monitoring displays 16A, 16B and the composite machine 13 are shared with the users as the attendances of the conference. Also, physical position of the monitoring displays 16A and 16B and the composite machine 13 in the conference room 11 are mapped on the coordinate of a rectangular paper, and then the user designates the output destination by using the coordinate on the paper.

First, the conference room in which the user is positioned is specified. In more detail, a room specifying module 27 executes either (a) or (b) given as follows.

(a) The user comes into a room while carrying an IC card to identify the user. Then, the card reader provided to the conference room identifies the user and specifies the place where the user is present. Then, the conference room is identified when the pen-type scanner dedicated to the owner of the IC card is used. That is, the owner is identified by the pen-type scanner, and then the conference room is specified by the place where the owner is present.

(b) The conference room is specified when the pen-type scanner dedicated to the conference room (the pen-type scanner is associated in advance with the conference room) is used.

Step 11: The registration of the output destinations of the conference room is carried out every conference room. Because the conference room is approximated by a rectangle and the output destinations are limited, a layout diagram is not needed (details will be described later).

Step 12: The paper document used in the conference as well as the document ID (Identification number) used to identify the paper document and the coordinate on a sheet of the paper is printed by the composite machine 13. This printing is similar to the ordinary document printing except that the document ID and the coordinate on the sheet of the paper are overlaid. Here, the printed documents are three sheets of paper documents 14A, 14B and 14C with a coordinate.

Step 13: The conferees (17A to 17D) attend the conference while looking at the paper document. When some conferee wishes to discuss the document on different page from the page being displayed now on the monitoring display 16A or the monitoring display 16B, this conferee likens a shape of the paper document on that page to a profile of the conference room and then puts a pen-type reader 15 on the position, in and around which the display to be displayed is set, on the paper document.

Step 14: The pen-type reader 15 reads the document ID and the coordinate from the paper document, and sends them to a conference output control equipment 12.

Step 15: The conference output control equipment 12 displays the document corresponding to the document ID on the display corresponding to the coordinate. Now the conferee displays the contents of the paper at which this conferee is looking on a desired display. In the example shown in FIG. 1, the paper document "1" is displayed on the monitoring display 16A on the right side because the conferee causes the pen-type reader 15 to read the upper right of the paper document "1" (14A), and the paper document "2" is displayed on the monitoring display 16B on the left side because the conferee causes the pen-type reader 15 to read the upper left of the paper document "2" (14B).

Also, even when the conferee moves to the different conference room together with the paper document, this conferee can apply the same operation to the output equipment in the conference room at the new address by the same document.

Figure 2:
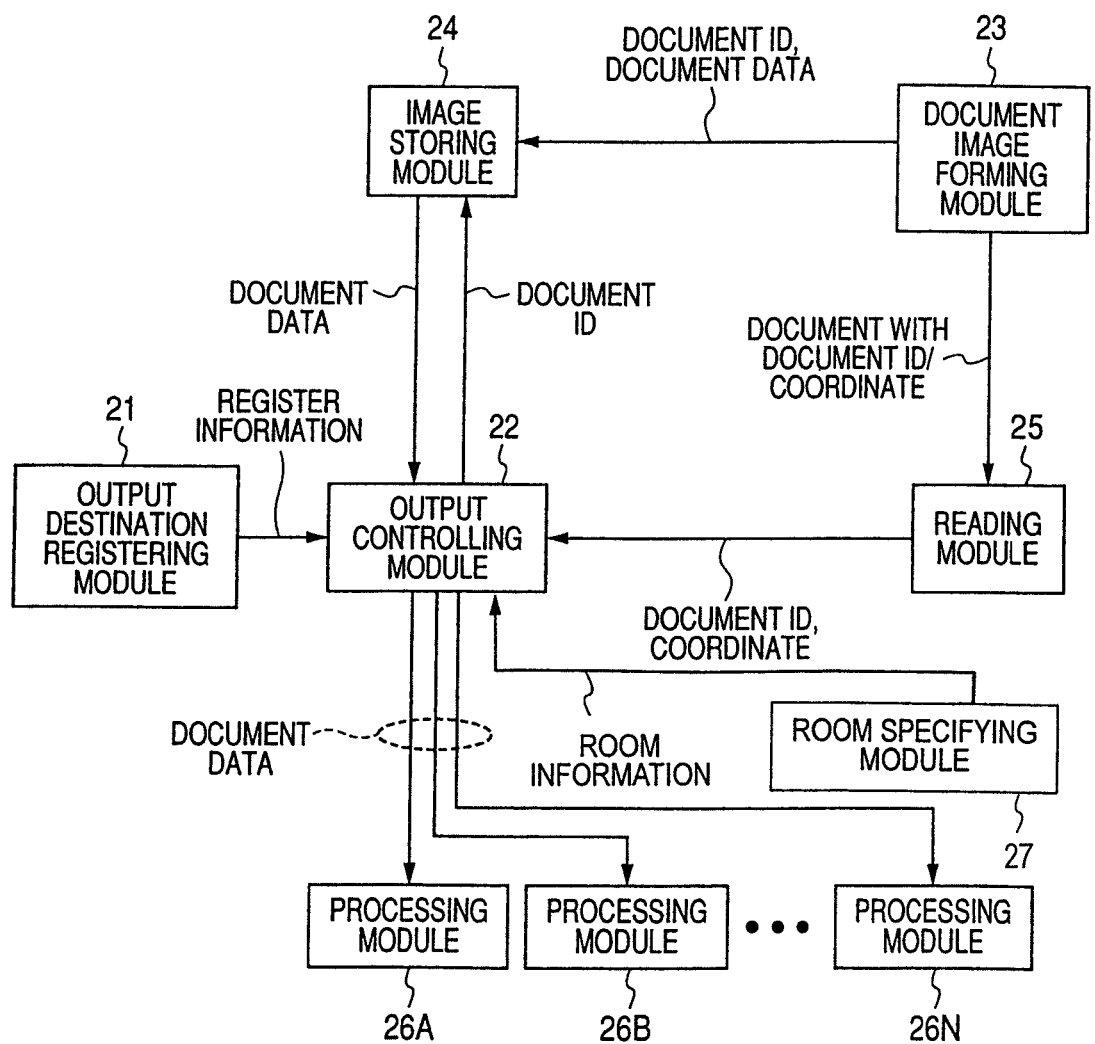
FIG. 2 is a conceptual module configurative view explaining the configurative example of the first embodiment.

FIG. 2 shows a conceptual module configurative view of the configurative example of the first embodiment.

The information processing system of the present embodiment includes an output destination registering module 21, an output controlling module 22, a document image forming module 23, an image storing module 24, a reading module 25, a processing module 26A, and others.

The document image forming module 23 is connected to the image storing module 24 and the reading module 25. The document image forming module 23 attaches the document ID and the coordinate to the document used in the conference, and then transfers the document ID and the document data to the image storing module 24. The document image forming module 23 displays the document on the document medium. The document medium is read by the reading module 25.

The image storing module 24 is connected to the output controlling module 22 and the document image forming module 23. The image storing module 24 stores the document ID and the document data received from the document image forming module 23 to correlate with each other. Also, the image storing module 24 receives the extraction instruction from the output controlling module 22, and transfers the document data to the output controlling module 22. That is, the image storing module 24 receives the document ID from the output controlling module 22, and then extracts the document data corresponding to this document ID and transfers it to the output controlling module 22. More concretely, the image storing module 24 may also be called a document database.

The reading module 25 is connected to the output controlling module 22 and the document image forming module 23. The reading module 25 reads the document ID and the coordinate from the document being displayed on the document medium by the document image forming module 23.

The output destination registering module 21 is connected to the output controlling module 22. The output destination registering module 21 registers the conference room and the physical position of the output destination of the conference room, and transfers the register information to the output controlling module 22.

The output controlling module 22 is connected to the output destination registering module 21, the image storing module 24, the reading module 25, and the processing modules 26A, 26B ..., 26N. The output controlling module 22 maps the physical position of the output destination and the coordinate on the document medium received from the output destination registering module 21, and specifies the output destination (any one of the processing modules 26A, 26B ..., 26N) in the physical position corresponding to the coordinate that is read by the reading module 25. Also, the output controlling module 22 extracts the document data corresponding to the document ID being read by the reading module 25 from the image storing module 24, and transfers the document data to the output destination.

The processing modules 26A, 26B ..., 26N selected by the output controlling module 22 are connected to the output controlling module 22, and process the document data being received from the output controlling module 22. In this case, the processing modules 26A, 26B ..., 26N are the monitoring displays 16A and 16B, for example. In the following, mainly the large-size projector will be explained by way of example hereinafter.

With respect to the document image forming module 23 and the reading module 25, there are two cases where a paper document is used as the document medium and a pad-type computer is used as the document medium.

Figure 3:
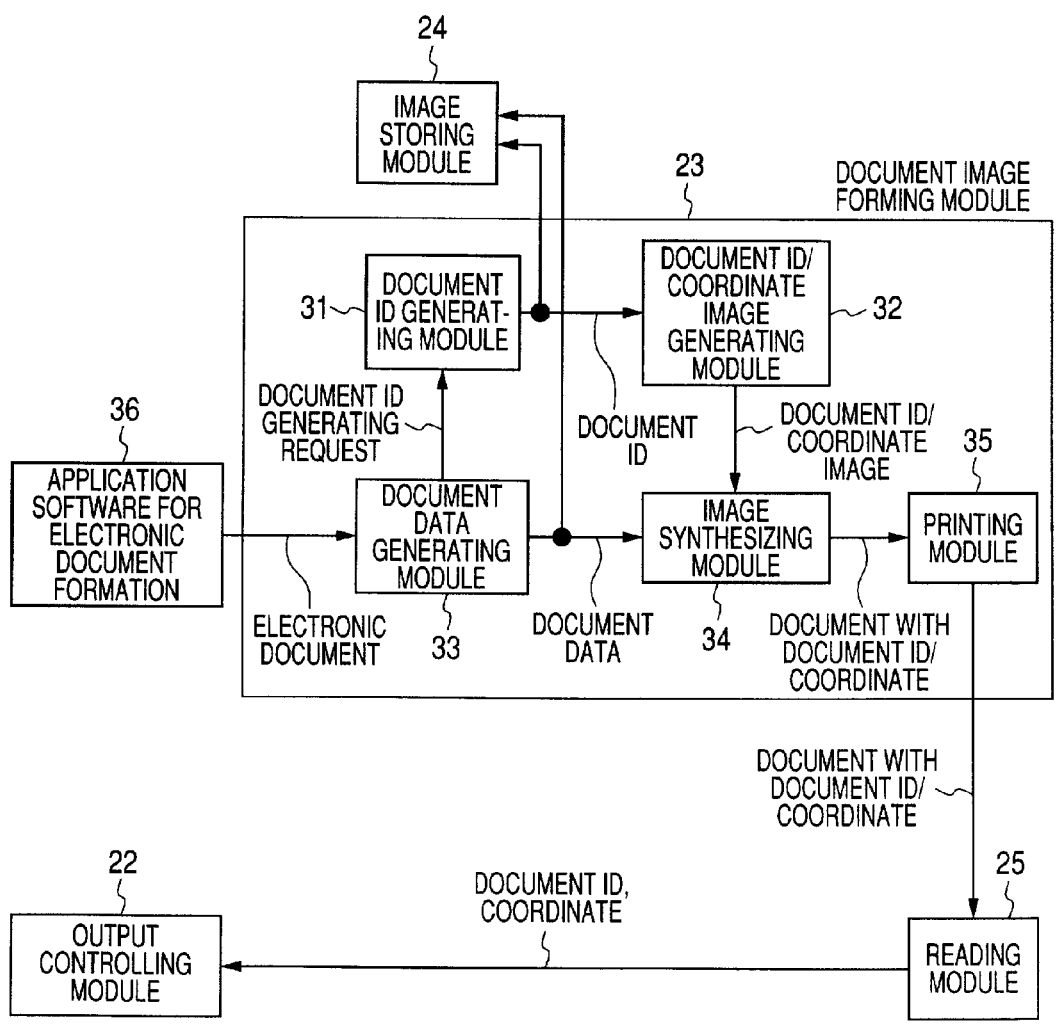
FIG. 3 is a conceptual module configurative view explaining mainly the configurative example in a document image forming module.

First, a module configurative example in the document image forming module 23 in the case where the paper document is used as the document medium will be explained mainly, as the first case, with reference to FIG. 3 hereunder.

A document ID generating module 31, a document ID/coordinate image generating module 32, a document data generating module 33, an image synthesizing module 34, and a printing module 35 are provided in the document image forming module 23. The document ID generating module 31 is connected to the image storing module 24, the document ID/coordinate image generating module 32, and the document data generating module 33; the document ID/coordinate image generating module 32 is connected to the document ID generating module 31 and the image synthesizing module 34; the document data generating module 33 is connected to the image storing module 24, the document ID generating module 31, the image synthesizing module 34, and an application software 36 for the electronic document formation; the image synthesizing module 34 is connected to the document ID/coordinate image generating module 32, the document data generating module 33, and the printing module 35; and the printing module 35 is connected to the reading module 25 and the image synthesizing module 34. Also, the application software 36 for the electronic document formation is connected to the document data generating module 33 in the document image forming module 23. Also, the image storing module 24 is connected to the document ID generating module 31 and the document data generating module 33 in the document image forming module 23; and the reading module 25 is connected to the output controlling module 22 and the printing module 35 in the document image forming module 23. The output controlling module 22 is connected to the reading module 25 as in the example shown in FIG. 2.

The electronic document used in the conference is arranged by the application software 36 for forming various electronic documents, e.g., PowerPoint (registered trademark) available from Microsoft Corporation, or the like. This electronic document is transferred to the document data generating module 33 serving as the module constituting the document image forming module 23.

The document data generating module 33 receives the electronic document from the application software 36 for forming the electronic document, converts the document into the document data such as PDL (Print Description Language) data that the printer can interpret and convert into the image, image data that can be printed as they are, etc., and transfers the document data to the image synthesizing module 34 and the image storing module 24. The printer driver, the decomposer in the printer, and the like, for example, can execute these functions. The document data generating module 33 notifies the document ID generating module 31 of the request for the document ID generation. In this case, the conversion into the document data and the request for the document ID generation may be executed in parallel or in seriatim (the order is not particularly designated).

The document ID generating module 31 receives the request for the document ID generation from the document data generating module 33, generates the concerned document and the document ID used to identify respective pages of the document, and transfers the document ID to the document ID/coordinate image generating module 32 and the image storing module 24. In order to render the document ID unique in the all world, 128-bit Universally Unique Identification (referred to as "UUID" hereinafter) decided based on Ethernet-Mac-Address of the computer that executes the program and a clock, for example, may be used. In order to render the document ID unique in the particular maker computer system, the serial number of the computer, for example, may be used instead of Ethernet-Mac-Address. In order to render the document ID unique in one computer, the unused number in an administration table, for example, may be used. When the UUID is used, the document ID becomes unique even though the document IDs generated by the computers manufactured by different makers are present mixedly.

The document ID generated by the document ID generating module 31 and the document data generated by the document data generating module 33 are transferred to the image storing module 24 as paired data. The timings at which respective data are transferred may be controlled simultaneously, or respective data may be transferred in order of generation, for example.

Figure 4A:
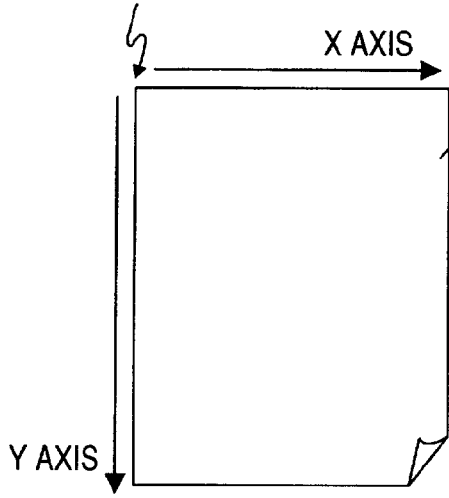
FIGS. 4A and 4B are explanatory views showing an example of coordinate information.
Figure 4B:
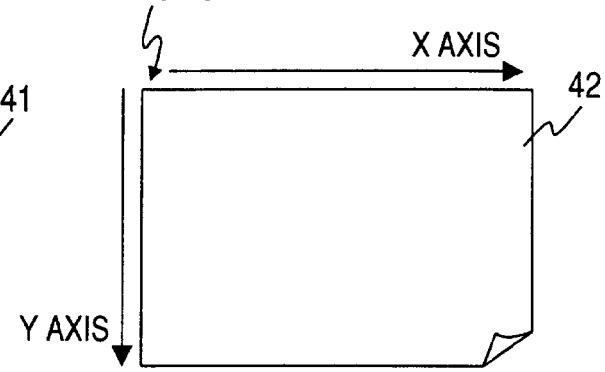

Then, the document ID/coordinate image generating module 32 receives the document ID from the document ID generating module 31, generates the information image including the coordinate information and the document ID to specify the position on the paper document, and transfers the information image to the image synthesizing module 34. The coordinate information is set on the coordinate system in which, like the example shown in FIG. 4, upper left vertexes of paper documents 41 and 42 are set as an origin respectively and an abscissa is set to an X-axis and an ordinate is set to a Y-axis, for example. That is, the Y-axis is longer than the X-axis in the portrait-oriented paper document 41 as shown in FIG. 4A, and the X-axis is longer than the Y-axis in the landscape-oriented paper document 42 as shown in FIG. 4B.

The image synthesizing module 34 receives the information image containing the coordinate information and the document ID from the document ID/coordinate image generating module 32, synthesizes the image information with the document data being received from the document data generating module 33, and transfers the document data with document ID/coordinate to the printing module 35.

The printing module 35 outputs the paper document on which the document data to which the information image indicating the document ID and the coordinate information are affixed are printed. The conferee of the conference receives the paper document.

The reading module 25 reads the coordinate information and the document ID printed on the paper in response to the operation of the operator as the conferee of the conference. The reading module 25 transfers the read coordinate information and the read document ID to the output controlling module 22.

In the case where the paper document is used as the document medium, the reading module 25 is realized by the pen-type scanner. The reading module 25, and the like can be implemented by the system set forth in JP-A-2006-254299, for example.

Figure 5:
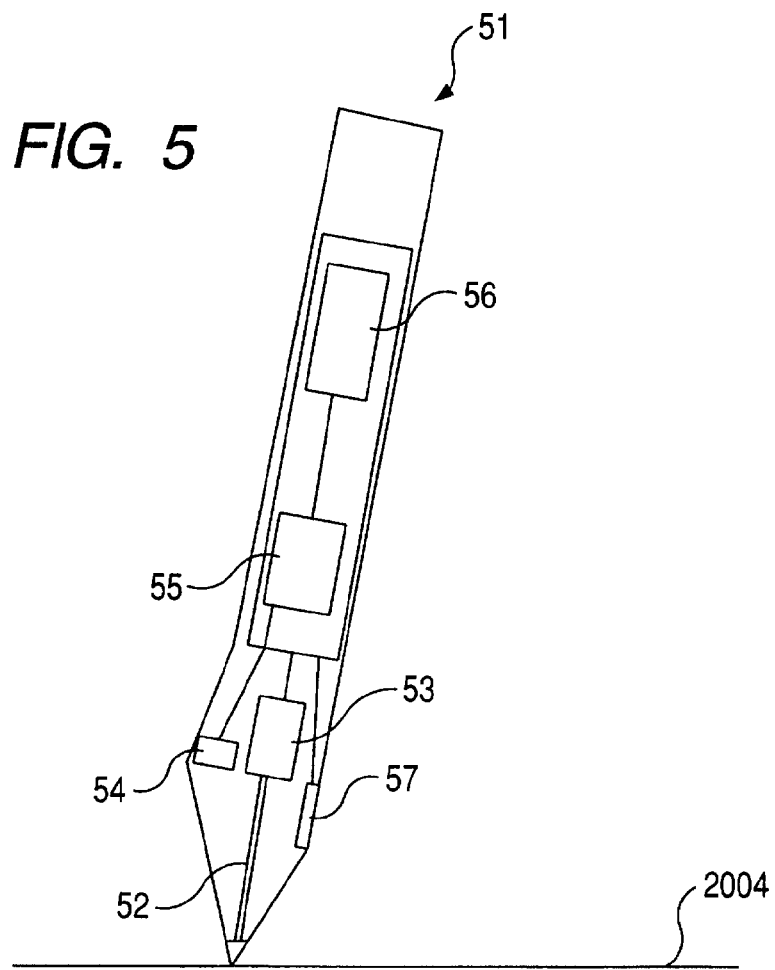
FIG. 5 is an explanatory view showing mainly a configurative example of a pen type scanner.

A configurative example of a pen-type scanner 51 as one type of the reading module 25 will be explained mainly with reference to FIG. 5 hereunder. In this FIG. 5, a configurative example of the pen-type scanner 51 is shown and also a paper document 2004 is shown.

The pen-type scanner 51 is equipped with a writing portion 52 used to write on the paper document 2004; a motion sensing module 53 for sensing a pressure put on a writing pen, for example, to sense a writing motion of the writing portion 52, e.g., whether or not the operator is writing (the operator is pointing, or the like); an image accepting module 54 for picking up an image at and around a writing point on the paper by picking up an information image on the paper document 2004 by the two-dimensional imaging device such as CCD, or the like, for example; a code information acquiring module 55 for acquiring the document ID and the coordinate information on the paper document 2004 by decoding the information image being input from the image accepting module 54; an information storing module 56 formed of a memory that stores/holds the document ID and the coordinate information, or the like; and a communicating module 57 for transmitting the stored document ID and the stored coordinate information to the external output controlling module 22.

Here, the information image may be read by referring to a reflected light of a light emitted from a light emitting portion provided to the top of the pen-type scanner 51, or by referring to a natural light. Also, the information image may be read by sensing absorption points of the light or sensing dots of the light, for example.

Also, in addition to the approach for sensing the pressure put on a writing pen, other approaches such as the approach for sensing a change of an electric conductivity caused by a touch of a pen point, or the like, for example, may be applied to sense whether or not the writing is now executed by the writing portion 52.

Also, as the communicating module 57, the wire cable such as USB, or the like or the radio such as Bluetooth (registered trademark), or the like, for example, can be used.

A conceptual module configuration of a configurative example of the pen type scanner 51 as one type of the reading module 25 will be explained mainly with reference to FIG. 6 hereunder.

The pen type scanner 51 has the image accepting module 54, an information image processing module 60 containing the code information acquiring module 55, the information storing module 56, a controlling module 61, the motion sensing module 53, and the communicating module 57.

The controlling module 61 is connected to respective modules, and controls respective modules. In this case, the illustration of the controlling module 61 is omitted from the pen-type scanner 51 shown in FIG. 5. The image accepting module 54 is connected to the code information acquiring module 55, and transfers the information image to the code information acquiring module 55. The code information acquiring module 55 is connected to the information storing module 56, and transfers the document ID and the coordinate information to the information storing module 56.

The controlling module 61 causes the code information acquiring module 55 in the information image processing module 60 to convert the information image that the image accepting module 54 accepted into the document ID and the coordinate information, in response to the action that the motion sensing module 53 sensed, and then causes the information storing module 56 to store the document ID and the coordinate information. The controlling module 61 transmits the code information stored in the information storing module 56 to the output controlling module 22 via the communicating module 57.

An example of the information image explained with reference to FIG. 7 hereunder.

In this example, the information image in which the document ID is embedded and the information image in which the coordinate information of the paper sheet is embedded are constructed by combining two types of bit pattern images.

For example, the information image representing the document ID or the coordinate information is constructed by the 8×8 matrix (in this example, a square) formed by combining two types of bit pattern images (a right-upward inclined line and a right-downward inclined line). The document ID or the coordinate information can be embedded on the paper sheet at an interval of about 2 mm (8 bit pattern image×8 bit pattern image), for example.

Figure 7:
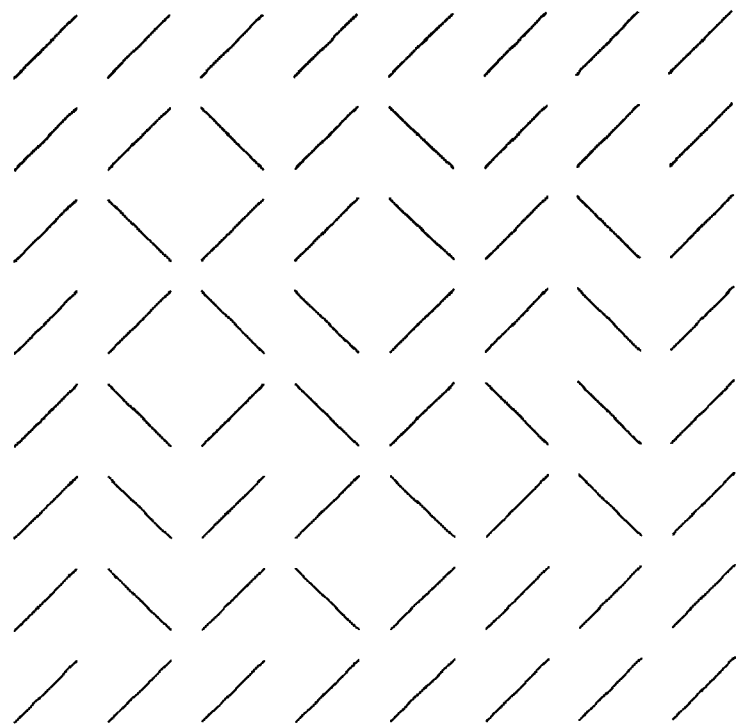
FIG. 7 is an explanatory view showing an example of information image.

In the example in FIG. 7, the same bit pattern image is used through one row on the uppermost side and one column on the leftmost side, and is used as a synchronous code. The document ID or the coordinate information is represented by the bit pattern images in the remaining portion.

Here, the information image may be printed on the overall surface of the paper document or may be printed only one the portion of the coordinate region. The coordinate region will be described later.

Second, a module configurative example in the document image forming module 23 in the case where the pad-type computer is used as the document medium will be explained mainly, as the second case, with reference to FIG. 8 and FIG. 9 hereunder.

The pad-type computer (also referred to as a tablet-type PC) is the mobile PC that has the almost equivalent function to the notebook PC and can sense the coordinate that a stylus pen, or the like touches because the film on which the data can be input by the stylus pen, or the like is pasted on the liquid crystal display, for example. Usually the pad-type computers of the same number as the conferees are prepared in the conference room. In the example shown in FIG. 8 and FIG. 9, normally the document image forming module 23 and the reading module 25 are implemented by the pad-type computer.

Figure 8:
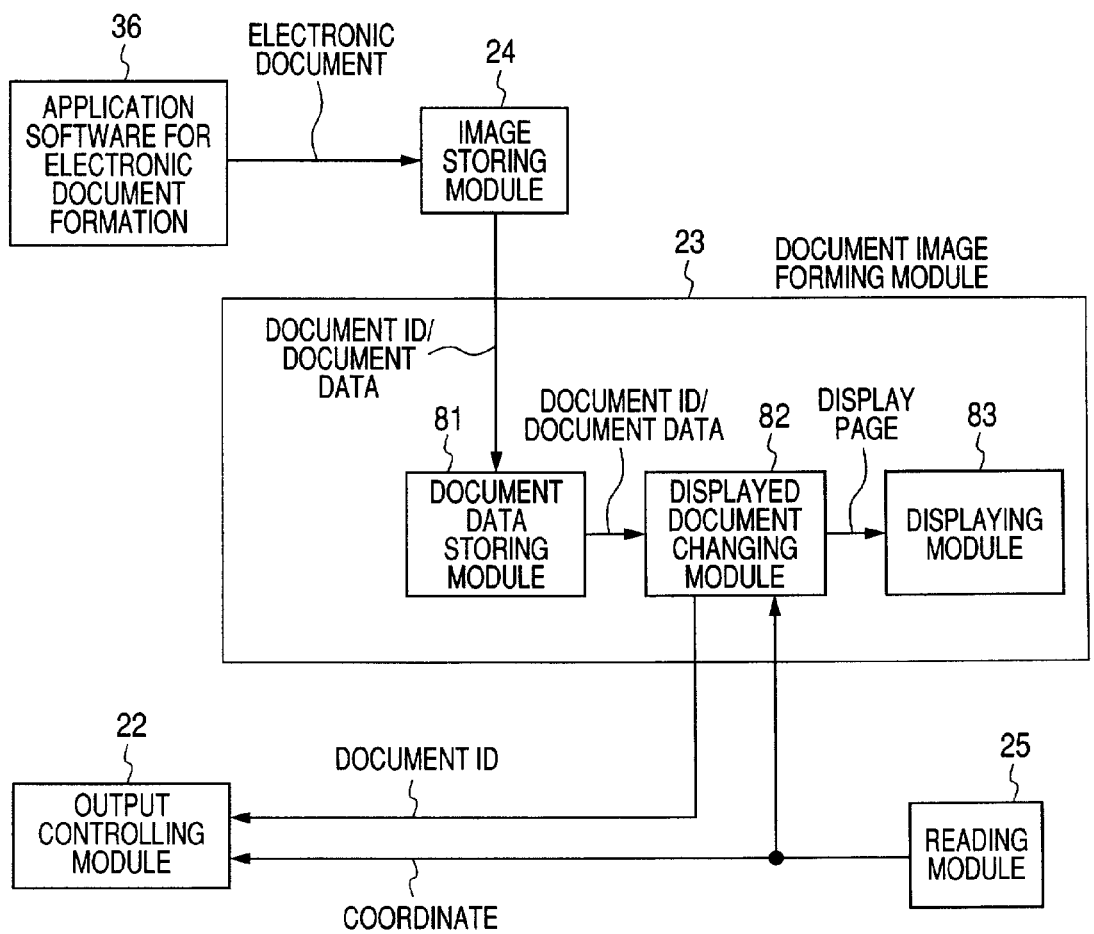
FIG. 8 is a conceptual module configurative view explaining mainly a configurative example in the document image forming module.

In the example shown in FIG. 8, the document image forming module 23 has a document data storing module 81, a displayed document changing module 82, and a displaying module 83. The document data storing module 81 is connected to the image storing module 24 and the displayed document changing module 82. The displayed document changing module 82 is connected to the output controlling module 22, the reading module 25, the document data storing module 81, and the displaying module 83. The displaying module 83 is connected to the displayed document changing module 82. Also, the application software 36 for electronic document formation is connected to the image storing module 24; the output controlling module 22 is connected to the reading module 25 and the displayed document changing module 82 in the document image forming module 23; the image storing module 24 is connected to the application software 36 for electronic document formation and the document data storing module 81 in the document image forming module 23; and the reading module 25 is connected to the output controlling module 22 and the displayed document changing module 82 in the document image forming module 23.

In this case, in the configurative example shown in the FIG. 8, the output controlling module 22 and the document image forming module 23 in the configurative example shown in the FIG. 2 are connected. Also, the document image forming module 23 and the reading module 25 may be constructed in the pad-type computer.

The electronic document formed by the application software 36 for electronic document formation is stored in the image storing module 24.

Then, the image storing module 24 gives the document ID to the electronic document, and transfers the electronic document with the document ID to the document data storing module 81 as the constituent element of the document image forming module 23 as the displayable document data.

The document data storing module 81 stores the document ID and the document data received from the image storing module 24 as paired data, and transfers the document ID and the document data to the displayed document changing module 82 when this module is accessed by the displayed document changing module 82.

Concretely, the displayed document changing module 82 is the user interface for the document display application in the pad-type computer, for example. As a result, when the displayed document changing module 82 executes a changing operation of the displayed document and the page in response to the operation of the operator, such displayed document changing module 82 causes the displaying module 83 to display the concerned page of the document on the display of the pad-type computer.

The reading module 25 consists of the stylus pen and the coordinate-detectable film, for example, and the coordinate information has the upper left vertex of the document as an origin, as shown in FIG. 4. For example, when the operator causes the stylus pen to touch the display screen, the film senses the coordinate of this touched portion and notifies the output controlling module 22 of the coordinate information. Also, when the reading module 25 senses the touch, the displayed document changing module 82 notifies the output controlling module 22 of the document ID of the document being displayed on the display.

Figure 9:
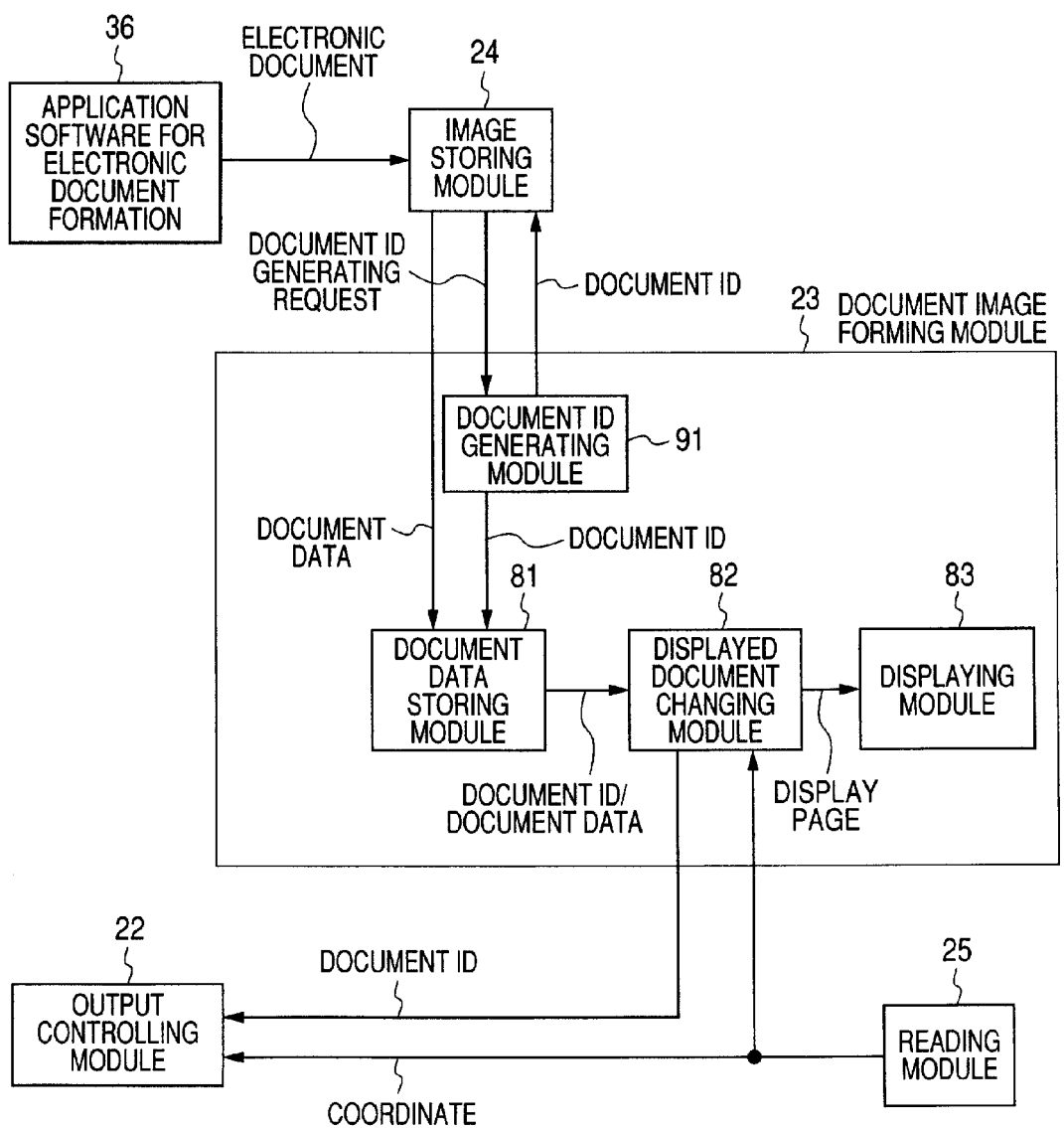
FIG. 9 is a conceptual module configurative view explaining mainly the configurative example in the document image forming module.

In the example shown in FIG. 9, the document image forming module 23 has the document data storing module 81, the displayed document changing module 82, the displaying module 83, and a document ID generating module 91. The document data storing module 81 is connected to the image storing module 24, the displayed document changing module 82, and the document ID generating module 91; the document ID generating module 91 is connected to the image storing module 24 and the document data storing module 81; and the image storing module 24 is connected to the application software 36 for electronic document formation, and the document data storing module 81 and the document ID generating module 91 in the document image forming module 23. Other modules are similar to those shown in FIG. 8.

In this case, in the configurative example shown in FIG. 9, the output controlling module 22 and the document image forming module 23 in the configurative example shown in FIG. 2 are connected. Also, the document image forming module 23 and the reading module 25 may be constructed in the pad-type computer.

In the example shown in FIG. 8, the image storing module 24 generates the document ID. In the example shown in FIG. 9, the pad-type computer generates the document ID.

The image storing module 24 receives the electronic document from the application software 36 for electronic document formation, and requests the generation of the document ID from the document ID generating module 91 in the document image forming module 23. The image storing module 24 transfers the document data to the document data storing module 81 as the constituent element of the document image forming module 23 as the displayable document data.

The document ID generating module 91 generates the document ID based on the request from the image storing module 24, and transfers the document ID to the image storing module 24 and the document data storing module 81.

The document data storing module 81 stores the document ID received from the document ID generating module 91 and the document data received from the image storing module 24 as a pair, and transfers the document ID and the document data to the displayed document changing module 82 when this document data storing module 81 is accessed by the displayed document changing module 82.

Also, the image storing module 24 may transfer the document ID received from the document ID generating module 91 to the pen-type scanner 51. In such case, it is not needed to transfer the document ID from the document ID generating module 91 to the document data storing module 81, and there is no necessity that the document ID generating module 91 and the document data storing module 81 should be connected mutually.

Figure 10:
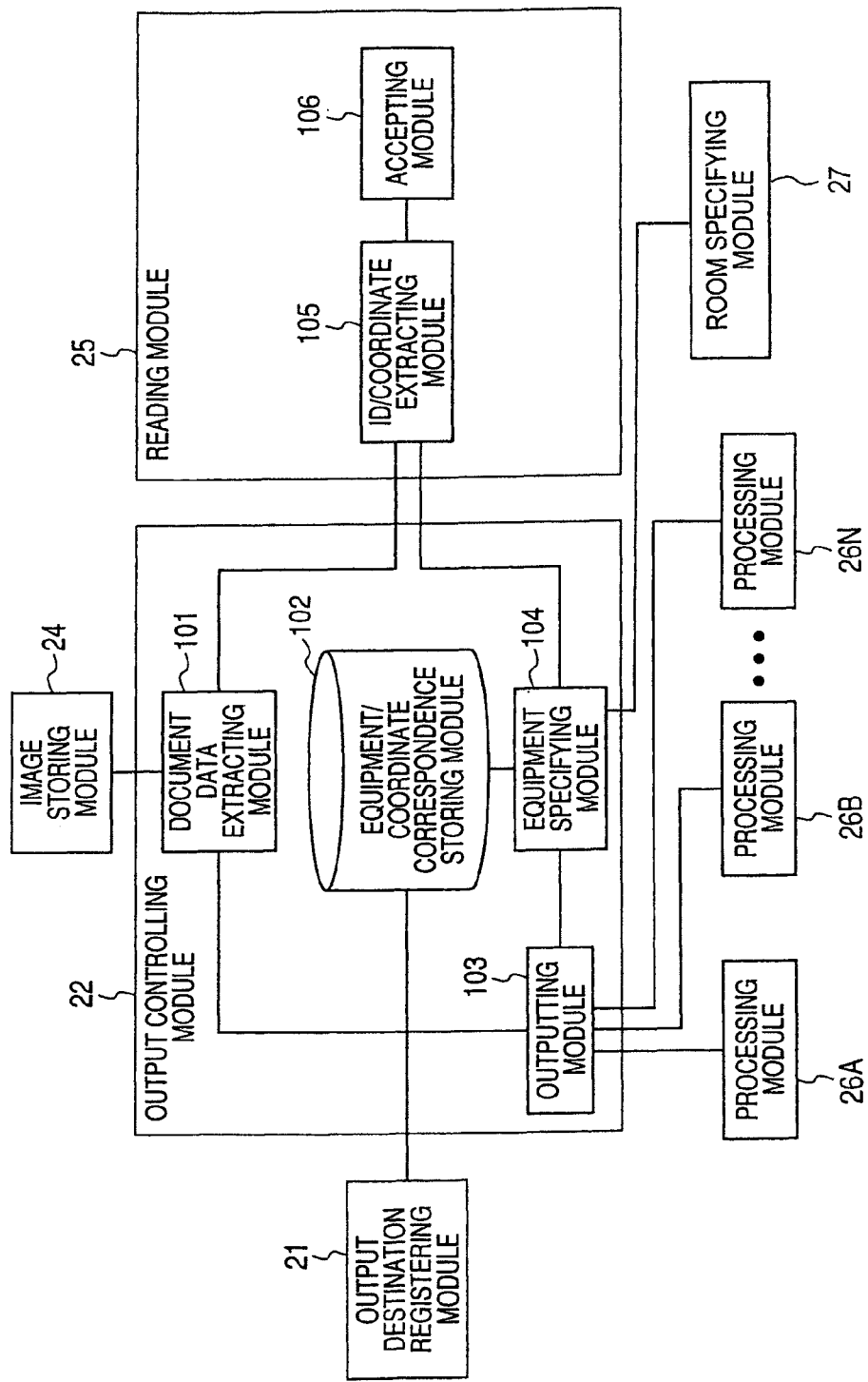
FIG. 10 is a conceptual module configurative view explaining mainly a configurative example in an output controlling module.
Figures 12A, 12B, 12C, 12D:
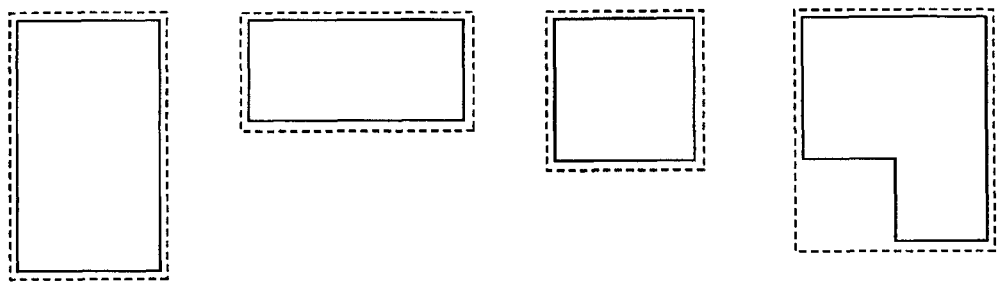
FIGS. 12A to 12K are explanatory views showing an example of the case where a rectangular conference room profile is assumed.
Figure 12E:
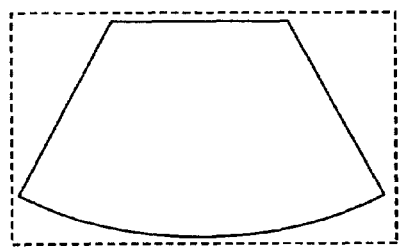
Figure 12F:
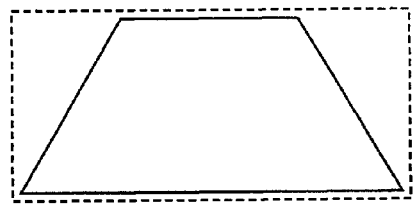
Figure 12G:
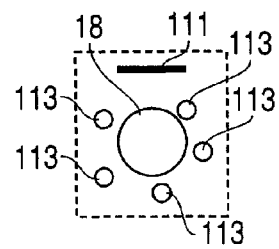
Figure 12H:
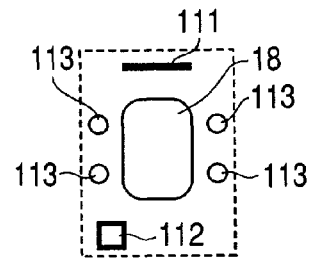
Figure 12I:
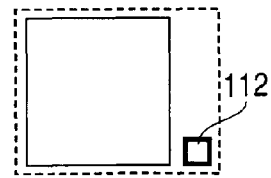
Figures 12J, 12K:
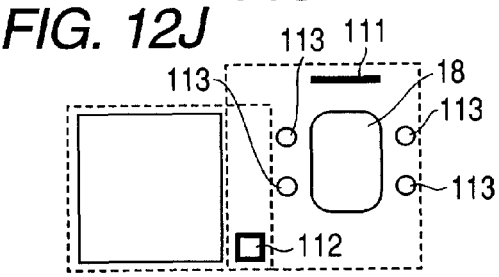

A conceptual module configuration of a configurative example of the output controlling module 22 will be explained mainly with reference to FIG. 10 hereunder.

The reading module 25 has an ID/coordinate extracting module 105 and an accepting module 106.

The accepting module 106 is connected to the ID/coordinate extracting module 105. When a paper is utilized as the document medium, the accepting module 106 receives the information image recited on the paper document and read by the image accepting module 54 in the writing portion 52, for example, and transfers the information image to the ID/coordinate extracting module 105. Here, the paper document may be printed by the document image forming module 23.

The ID/coordinate extracting module 105 is connected to the accepting module 106, and a document data extracting module 101 and an equipment specifying module 104 in the output controlling module 22. The ID/coordinate extracting module 105 extracts the code information, i.e., the document ID and the coordinate information, from the information image received from the accepting module 106. Also, when the pad-type computer is utilized as the document medium, the ID/coordinate extracting module 105 extracts the document ID of the document pointed by the operation of the operator using the stylus pen and the coordinate information in the document pointed by the operation, with respect to the document displayed on the display device of the pad-type computer, for example.

Then, the ID/coordinate extracting module 105 transfers the extracted document ID to the document data extracting module 101 in the output controlling module 22, and also transfers the coordinate information to the equipment specifying module 104.

Figure 6:
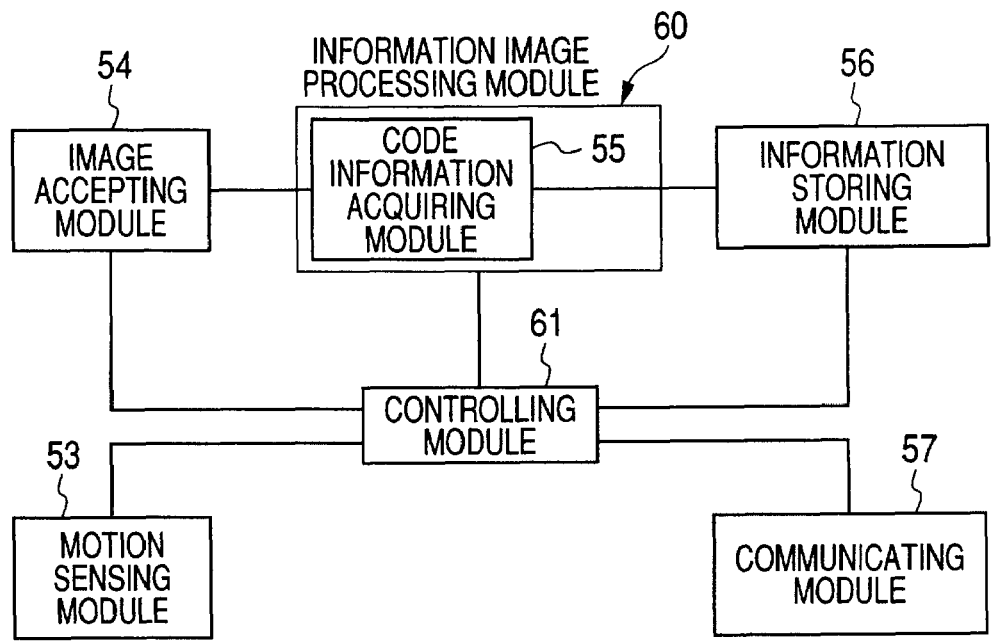
FIG. 6 is a conceptual module configurative view explaining mainly a configurative example in the pen type scanner.

Here, the code information acquiring module 55 in the pen-type scanner 51 shown in FIG. 6 corresponds to the ID/coordinate extracting module 105, and the image accepting module 54 corresponds to the accepting module 106. Also, the reading module 25 in the configurative example shown in FIG. 8 or FIG. 9 corresponds to the case where the ID/coordinate extracting module 105 is used to extract only the coordinate. Also, the displayed document changing module 82 in the configurative example shown in FIG. 8 or FIG. 9 corresponds to the case where the ID/coordinate extracting module 105 is used to extract only the document ID.

In this case, the ID/coordinate extracting module 105 may be divided into two modules. That is, the ID/coordinate extracting module 105 may be divided into an ID extracting module and a coordinate extracting module. The ID extracting module extracts a document identifier used to specify the paper document from the information image written on the paper document. The coordinate extracting module extracts the coordinate information from the information image written on the paper document. Both modules read the information image that the pen-type scanner 51 read, in response to the operation of the pen-type scanner 51 made by the operator.

The output controlling module 22 has the document data extracting module 101, an equipment/coordinate correspondence storing module 102, an outputting module 103, and the equipment specifying module 104.

The document data extracting module 101 is connected to the image storing module 24, the outputting module 103, and the ID/coordinate extracting module 105 in the reading module 25. The document data extracting module 101 extracts the document data corresponding to the document ID from the image storing module 24, in answer to the document ID extracted by the ID/coordinate extracting module 105. The document data extracting module 101 transfers the extracted document data to the outputting module 103.

The equipment/coordinate correspondence storing module 102 is connected to the output destination registering module 21, and the equipment specifying module 104. The equipment/coordinate correspondence storing module 102 receives correspondences between the coordinate information and the processing modules 26A, 26B . . . , 26N from the output destination registering module 21, and stores them. The equipment/coordinate correspondence storing module 102, when accessed by the equipment specifying module 104, transfers any one of identifiers of the processing modules 26A, 26B . . . , 26N corresponding to the coordinate information. As the correspondences that the equipment/coordinate correspondence storing module 102 stores, correspondences between the placing location of the processing modules 26A, 26B . . . , 26N in the conference room and the coordinate information may be stored. In addition, correspondences between the coordinate information and the operations in the processing modules 26A, 26B . . . , 26N may be stored. Here, the placing information contains the room information and the physical position information in that room.

The equipment specifying module 104 is connected to the equipment/coordinate correspondence storing module 102, the outputting module 103, and the ID/coordinate extracting module 105 in the reading module 25. The equipment specifying module 104 receives the coordinate information extracted by the ID/coordinate extracting module 105, and receives the room information specified by the room specifying module 27. The equipment specifying module 104 searches the contents of the equipment/coordinate correspondence storing module 102 by using the room information and the coordinate information, and specifies any one of the processing modules 26A, 26B . . . , 26N corresponding to the coordinate information. The equipment specifying module 104 transfers the identifier of the specified processing module out of the processing modules 26A, 26B . . . , 26N to the outputting module 103. Also, the equipment specifying module 104 may extract the operation of any one of the processing modules 26A, 26B . . . , 26N stored in the equipment/coordinate correspondence storing module 102 corresponding to the coordinate information, and may transfer the extracted operation to the outputting module 103.

The outputting module 103 is connected to the document data extracting module 101, the equipment specifying module 104, and the processing modules 26A, 26B . . . , 26N. The outputting module 103 outputs the document data extracted by the document data extracting module 101 to any one of the processing modules 26A, 26B . . . , 26N specified by the equipment specifying module 104. Also, the outputting module 103 may output the operation extracted by the equipment specifying module 104 to any one of the processing modules 26A, 26B . . . , 26N.

Next, the output destination registering module 21 will be explained hereunder.

The output destination registering module 21 registers beforehand the physical positions of the processing modules 26A, 26B . . . , 26N in the conference room as the registration information.

An example of the actual conference room is shown in FIG. 11. When the conference room is viewed from the top, FIGS. 11A to 11C show a rectangular profile, FIG. 11D shows an L-shaped profiled, and FIGS. 11E and 11F show other profiles. Also, FIGS. 11G and 11H show the case where an open conference room has no wall. A display device 111 (a large-size projector screen or a large-size display) is arranged around a conference table 18 and chairs 113. Then, a composite machine 112 is equipped in the conference room shown in FIG. 11H. FIG. 11I shows the case where the composite machine 112 used in the conference is set on the outside of the conference room, and FIGS. 11J and 11K show the case where one composite machine 112 used commonly in an open conference space K and a conference room J.

In the output destination registering module 21, rectangular (including square) conference room profiles indicated by a broken line in FIG. 12 are assumed with respect to respective examples of the conference rooms shown in FIGS. 11A to 11K. That is, rectangular profiles containing the conference room are assumed. In this case, as the conference room profile, a square for surrounding an outer circumference of the conference room, a square for surrounding the equipments such as the composite machine 112 used in the conference, and the like and conference fixtures such as the conference table 18, and the like, a conference room including the outer circumference of the conference room, the equipments such as the composite machine 112, and the like, and the conference fixtures may be employed.

Figure 13A:
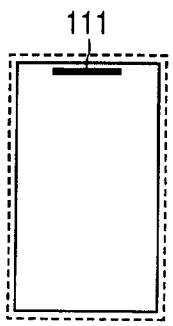
FIGS. 13A to 13K are explanatory views showing an example of the case where a display device, etc. are arranged in the conference room.
Figure 13B:
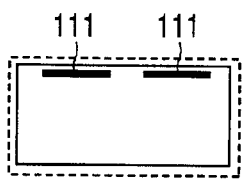
Figure 13C:
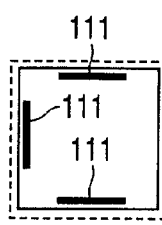
Figure 13D:
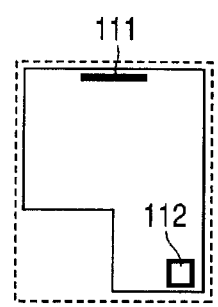
Figure 13E:
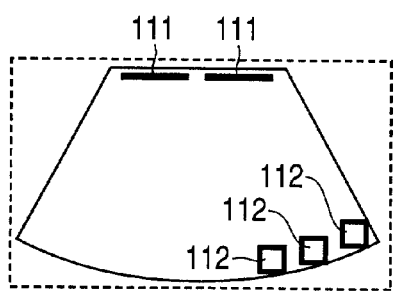
Figure 13F:
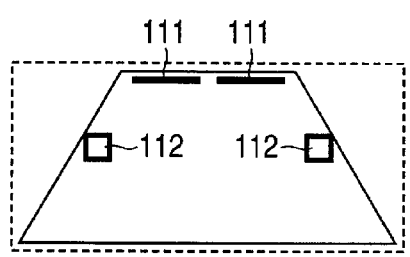
Figure 13G:
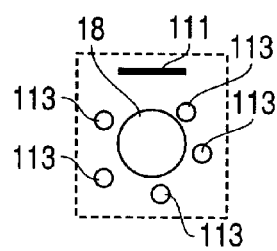
Figure 13H:
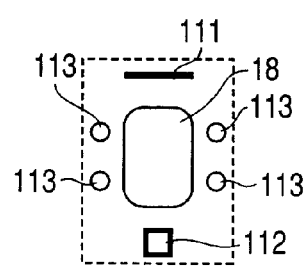
Figure 13I:
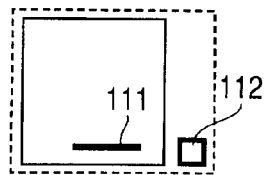
Figures 13J, 13K:
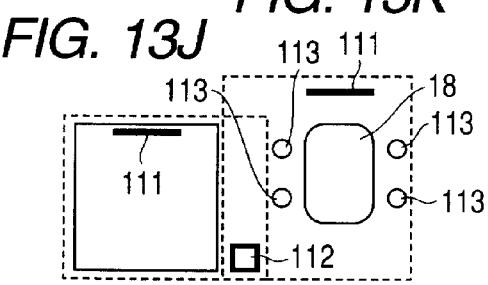

Next, physical placing locations of the equipments such as the display device 111 as the processing module 26, the composite machine 112, and the like will be explained hereunder. By reference to examples shown in FIG. 13, one display device 111 is arranged in the conference rooms shown in FIGS. 13A and 13G, two display devices 111 are arranged beside one wall in the conference room shown in FIG. 13B, three display devices 111 are arranged beside three walls respectively in the conference room shown in FIG. 13C, one display device 111 and one composite machine 112 are arranged respectively in the conference rooms shown in FIGS. 13D, 13H, 13I, 13J, and 13K, three composite machines 112 are arranged closely in the conference room shown in FIG. 13E, and the composite machines 112 are arranged in positions away from the sides of the rectangular conference room profile (rectangular shape indicated by a dotted line) in the conference room shown in FIG. 13F.

In the output destination registering module 21 of the first embodiment, one vertex of the conference room profile is set as a starting point and respective vertexes are set to b, c, d clockwise or anti-clockwise. The starting point is set arbitrarily anywhere, but an example in which the upper left vertex is set as the origin and respective vertexes are set clockwise is shown in FIG. 14.

The rectangular conference room profile indicated by a dotted line shown in FIG. 14 corresponds to the paper document 41 or the paper document 42 shown in FIG. 4. That is, respective vertexes a, b, c, d of the conference room profile shown in FIG. 14 correspond to respective vertexes of the paper document 41 or the paper document 42 shown in FIG. 4.

The output destination registering module 21 registers the registration information previously (prior to the conference) on the equipment/coordinate correspondence storing module 102 in the output controlling module 22 in response to the operation of the operator every conference room.

In the first embodiment, the registration information correlates the processing modules 26 with respective vertexes (i.e., respective sides) of the conference room profile. That is, the registration information registers that no vertex corresponds to the output destination or registers the output destination ID when the vertex corresponds to the output destination.

Figure 14A:
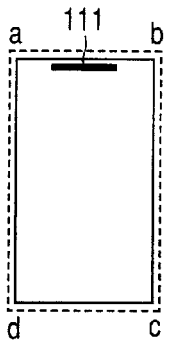
FIGS. 14A to 14K are explanatory views showing an example of the case where symbols are affixed to vertexes of the rectangular conference room profile.
Figure 14B:
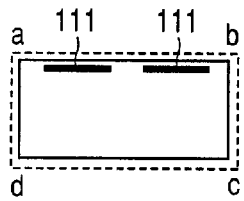
Figure 14C:
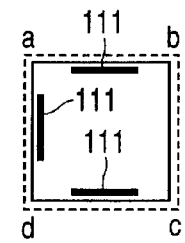
Figure 14D:
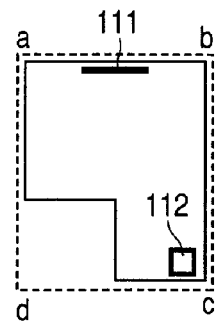
Figure 14E:
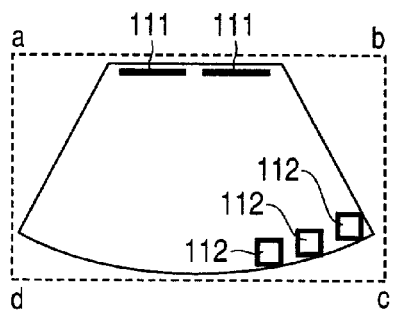
Figure 14F:
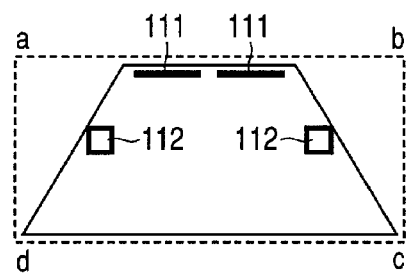
Figure 14G:
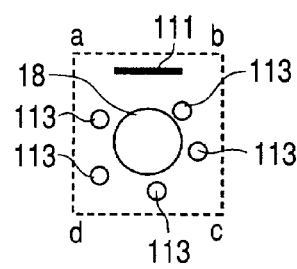

The registration information of conference rooms A and G shown in FIGS. 14A and 14G is shown in FIG. 15. The processing module 26 that exists from the vertex a as the starting point to the vertex b has one output destination ID: o_id1, and there is no processing module 26 from the vertex b to the vertex c, the vertex c to the vertex d, and the vertex d to the vertex a. The output destination ID may be set uniquely every conference room or may be set uniquely in the all world like UUID, as described above. Each vertex and the processing module 26 are separated by "; (semicolon)". Also, information to use the processing module 26 is set following to ", (comma)". An "address1" serving as the address of and the processing module 26 corresponding to o_id1 and a "protocol1" serving as the protocol used to communicate with the processing module 26 are designated by parentheses "( )". When the operator communicates with the processing module 26 via the network, the address is the network address and, for example, IP (Internet Protocol) address is used. When the network is not interposed, an identifier dedicated to the conference output control equipment 12 may be used. The protocol such as X-window system protocol, or the like may be designated when the processing module 26 is the display, and the protocol such as lpr (line printer demon protocol), or the like may be designated when the processing module 26 is the printer.

Figure 14H:
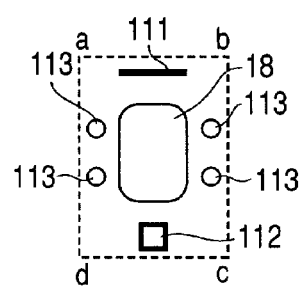
Figure 14I:
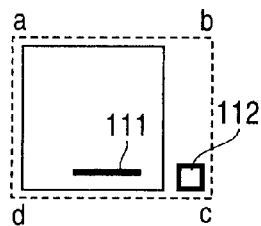
Figures 14J, 14K:
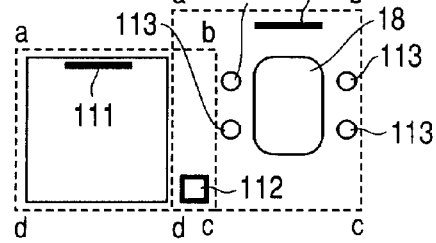

Similarly, in the first embodiment, the registration information of the conference room B shown in FIG. 14B is given in FIG. 16, the registration information of the conference room C shown in FIG. 14C is given in FIG. 17, the registration information of the conference rooms D, H shown in FIGS. 14D and 14H is given in FIG. 18, the registration information of the conference room E shown in FIG. 14E is given in FIG. 19, the registration information of the conference room F shown in FIG. 14F is given in FIG. 20, and the registration information of the conference room I shown in FIG. 14I is given in FIG. 21. For example, the registration information shown in FIG. 19 belongs to the conference room shown in FIG. 14E, and indicates that two display devices 111 having the output destination IDs: o_id1, o_id2 are arranged from the vertex a to the vertex b, no equipment is arranged from the vertex b to the vertex c, three composite machines 112 having the output destination IDs: o_id3, o_id4, o_id5 are arranged from the vertex c to the vertex d, and no equipment is arranged from the vertex d to the vertex a. Also, the addresses and the protocols of respective equipments are given.

In this case, the side with which the processing module 26 positioned at a corner between two sides should be correlated may be set arbitrarily.

Next, the process in the output controlling module 22 will be explained hereunder.

Figure 22:
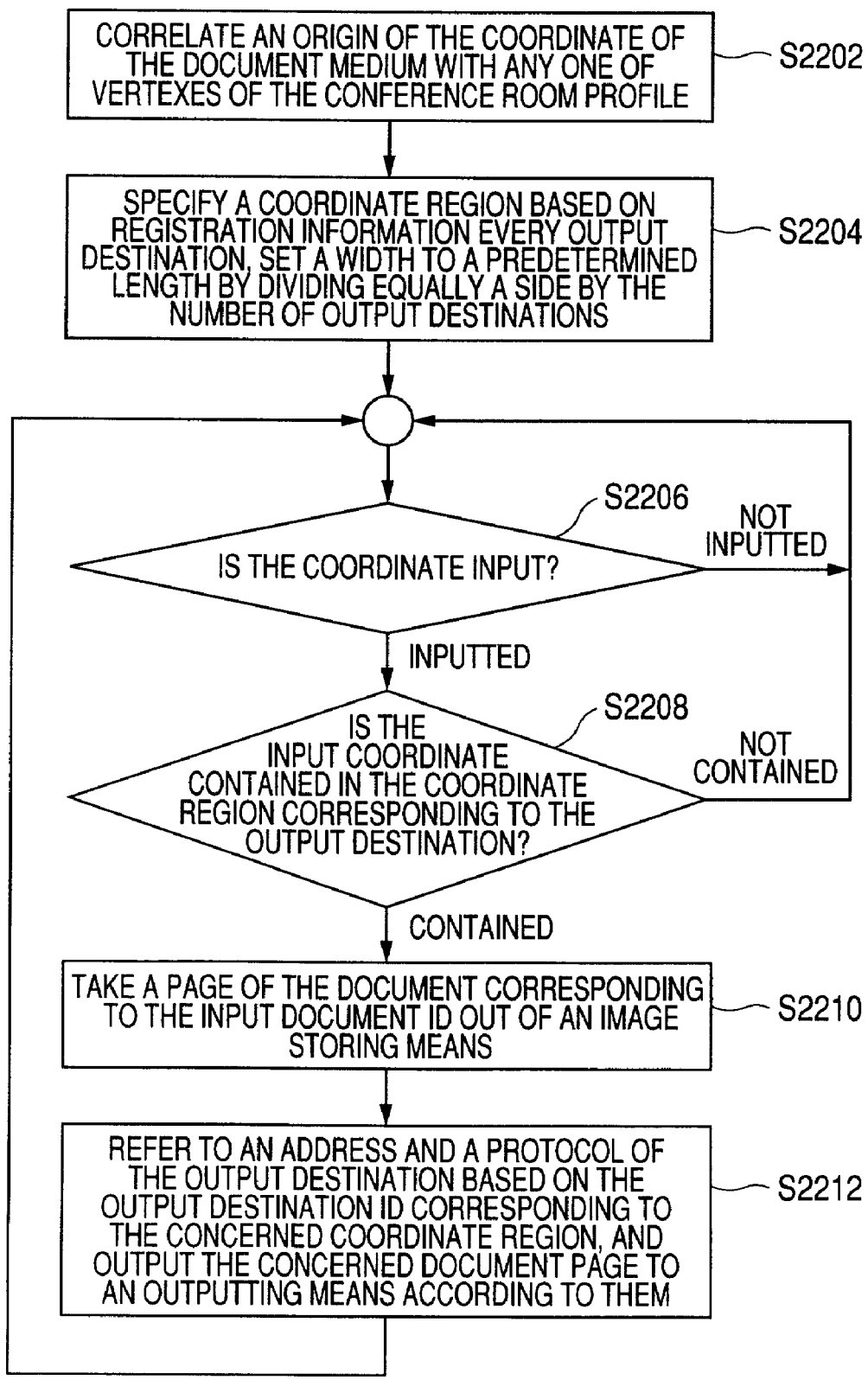
FIG. 22 is a flowchart showing a processed example of an output controlling module.

A flowchart of an example of process that the output controlling module 22 executes is shown in FIG. 22.

In step S2202, an origin of the coordinate of the document medium is correlated with any one of vertexes of the conference room profile. The correlation is set arbitrarily. For example, an origin of the coordinate is correlated with the left-side vertex of the side of the display that has the largest screen size in the conference room, the display that is used most often, or the like.

Figure 23B:
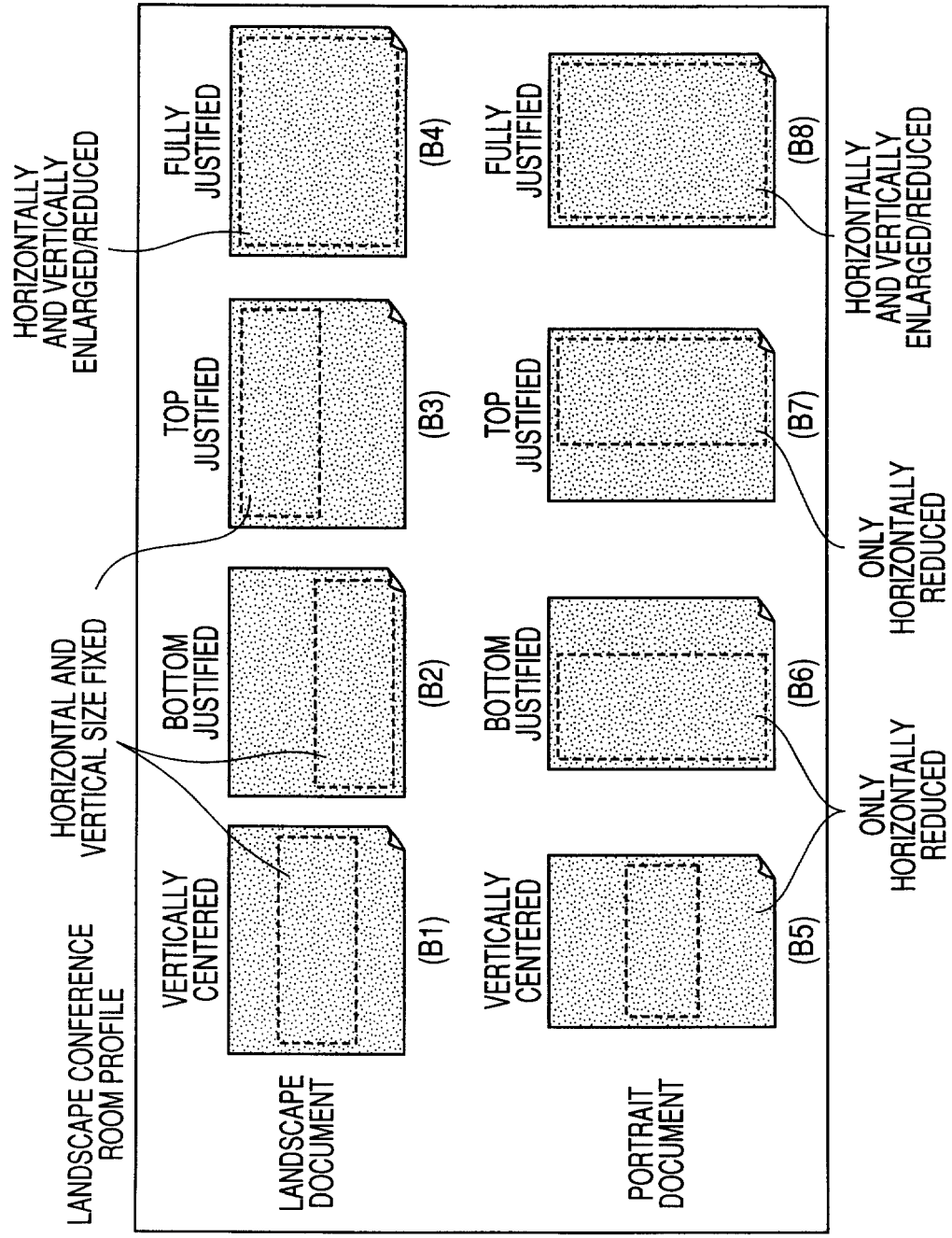

Examples in which various conference room profiles are correlated with the document medium are shown in FIG. 23. A rectangle indicated by a broken line gives the conference room profile. There are two types of conference room profiles, i.e., a portrait type (see FIG. 23A) and a landscape type (see FIG. 23B), and also there are two types of document mediums, i.e., a landscape type (upper stages of FIGS. 23A and 23B) and a portrait type (lower stages of FIGS. 23A and 23B). As a result, there are four combinations (four stages in FIG. 23) of both the conference room profile and the document medium. Also, there are horizontally centered, left justified, right justified, and fully justified alignments of the conference room profile with respect to the portrait type conference room profile, and also there are vertically centered, bottom justified, top justified, and fully justified alignments of the conference room profile with respect to the landscape type conference room profile. In addition, there are horizontal and vertical size fixed, only vertically enlarged, only horizontally reduced, and horizontally and vertically enlarged/reduced in different scales conference room profiles.

When the conference room profiles are saved, an aspect ratio of the conference room is fixed. Also, when the document medium is used effectively, a height and a width of the conference room profile are enlarged/reduced in respective scales.

Any correlation may be employed. In the present embodiment, the fully justified alignment and the horizontally and vertically enlarged/reduced scale that are common to all conference room profiles will be explained (see (A4) and (A8) of FIG. 23A, and (B4), (B8) of FIG. 23B). That is, the height and the width of the conference room profile are enlarged/reduced in different scales respectively such that the conference room profile can fit in with a profile of the document medium (respective sides of the document medium coincide with respective sides of the conference room profile).

Figures 24A, 24G:
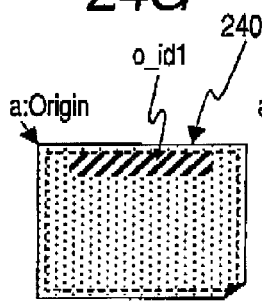
FIGS. 24A to 24K are explanatory views showing examples of a coordinate region every conference room.
Figure 24B:
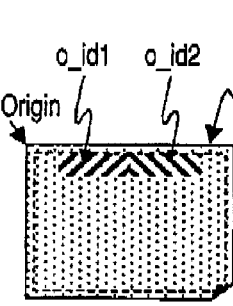
Figure 24C:
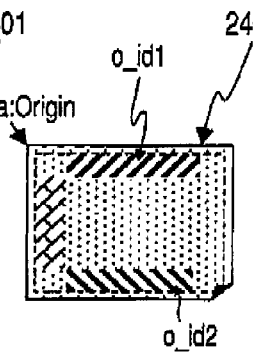
Figures 24D, 24H:
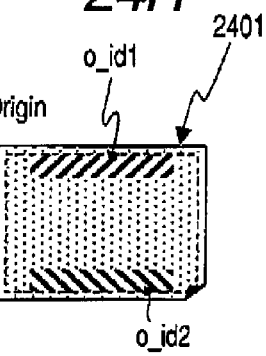
Figure 24E:
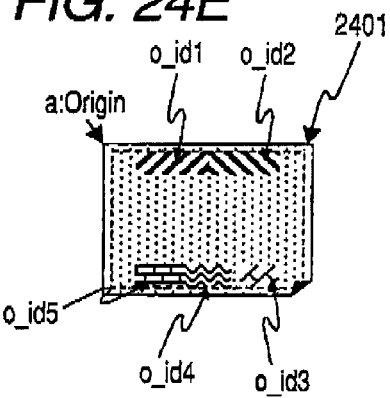
Figure 24F:
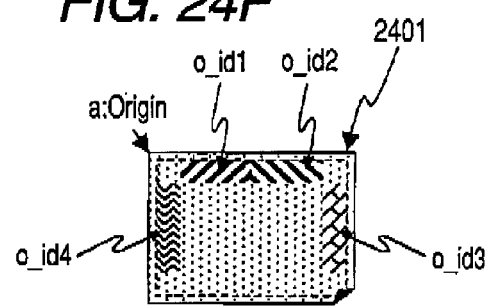
Figure 24I:
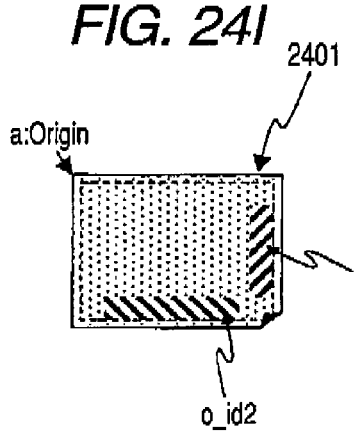
Figure 24J:
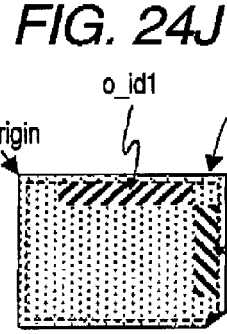
Figure 24K:
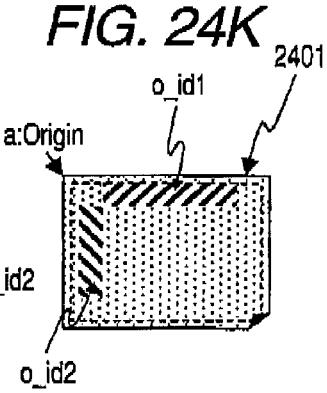

In step S2204, the coordinate region is specified based on the registration information every output destination. The coordinate region means a region that is occupied on the document medium. In the present embodiment, this specifying method divides equally a side by the number of output destinations. A width (the perpendicular direction to the side) of each coordinate region is arbitrary. In the present embodiment, the width is set to a fixed length (e.g., 3 cm), and a space region (e.g., 3 cm×3 cm) corresponding to this width is provided to four corners respectively. This is because it is difficult to specify to which side the output destination should belong at four corners. A schematic view of examples of the coordinate region every conference room is shown in FIGS. 24A to 24K. For example, the conference room profiles shown in FIGS. 14A and 14G correspond to FIG. 24A. That is, the vertex a of the conference room profile shown in FIG. 24A is set to coincide with an upper left vertex of the document medium (both vertexes are set as the origin), and the display device 111 (output destination ID: o_id1) is positioned at the center of an upper side of a paper document 2401. Here, the landscape-orientated document medium is illustrated in the example shown in FIGS. 24A to 24K, but the coordinate region can be specified similarly in the portrait-orientated document medium, except that lengths of the height and the width of the coordinate region are exchanged.

After making preparations up to now, the process goes to step S2206 to wait the input of the coordinate information. That is, it is decided whether or not the position of the document medium is designated by the operator (the coordinate information is input from the reading module 25). The process is still held in step S2206 if the coordinate is not input, while the process goes to step S2208 if the coordinate is input.

In step S2208, when the coordinate information is input from the reading module 25 in response to the operation of the operator, the equipment specifying module 104 in the output controlling module 22 decides whether or not the input coordinate is contained in the coordinate region corresponding to the output destination, by using the equipment/coordinate correspondence storing module 102. The process goes back to step S2206 if the input coordinate is not contained while the process goes to step S2210 if the input coordinate is contained.

In step S2210, the document data extracting module 101 in the output controlling module 22 takes the page of the document corresponding to the input document ID being input from the reading module 25 out of the image storing means 24.

Then, in step S2212, the outputting module 103 refers to the address and the protocol of the output destination based on the output destination ID corresponding to the concerned coordinate region, and outputs the concerned document page to the processing module 26 according to them.

In order to deal with the case where a plurality of conference rooms are present and the document medium is used while moving through a plurality of conference rooms, the conference room where the document medium is used now must be specified. As the specifying method, four types are given as follows.

(1) The reading module 25 is prepared every conference room. Then, the reading module 25 is correlated fixedly with the conference room such that the reading module 25 is forbidden to take out.

(2) The reading module 25 is prepared every conference room. Then, the reading module 25 and the output controlling module 22 are connected via cable such that the document ID and the coordinate information that the reading module 25 read are input only to the output controlling module 22, or a radio communication whose available range of a radio wave is limited within the conference room is utilized as the communicating means of the reading module 25.

(3) As shown in FIGS. 24A to 24K, when the conference room ID used to specify the conference room is set to the reading module 25 and then the document ID and the coordinate information are input, the conference room ID is also input together into the output controlling module 22. Then, the output controlling module 22 operates while referring to the registration information corresponding to the conference room ID. This method may be utilized in the remote conference system via the network to operate the output destination in the remote conference room.

(4) When the reading module ID used to specify the reading module 25 is set to the reading module 25 and then the document ID and the coordinate information are input, the reading module ID is also input together into the output controlling module 22. The reading module ID used there is registered every conference room ID every time when the conference is held, and the output controlling module 22 refers to the conference room ID from the reading module ID and refers to the registration information corresponding to the conference room ID in operation.

In the explanation made until now, the display device such as the display, the screen, or the like, the composite machine, the printing machine such as the printer, or the like, etc. are mentioned as the output destination by way of example. In addition to them, the facsimile, the display equipment of the opposing side conference room used in the remote TV conference system, the computer equipped in the conference room to save the document, the computer for processing the document, etc. may be employed. The document is sent via facsimile when the facsimile is used, the document is displayed on the opposing side when the display equipment of the opposing side conference room is used, the document is saved when the document saving computer is used, and the document is mailed to the conferee, is character-recognized, is translated into another language, is read out, or the like when the computer for other document processes is used. The operation of inputting the document into respective processes is made by transferring the document to these output destinations.

Next, a second embodiment will be explained hereunder.

In the second embodiment, the registration information formed by the output destination registering module 21 (the registration information stored in the equipment/coordinate correspondence storing module 102) and the process of the equipment specifying module 104 for specifying the coordinate region every output destination based on the registration information are different from the first embodiment. These two respects will be explained mainly hereunder.

The registration information of the conference room D shown in FIG. 14D will be explained with reference to FIG. 25 hereunder.

In the second embodiment, the registration information correlates the processing module 26 as the output destination with respective vertexes or areas between the vertexes (i.e., sides) of the conference room profile. That is, the fact that no output destination is assigned to respective vertexes and areas between the vertexes is registered or the output destination ID is registered when the output destination is assigned.

After the process is started, no processing module 26 is provided to the vertex a, the output destination ID: (o_id1) exists from the vertex a to the vertex b, no processing module 26 is provided to the vertex a and the area from the vertex b to the vertex c, the output destination ID:(o_id2) exists at the vertex c, and no processing module 26 is provided to the area from the vertex c to the vertex d, the vertex d, and the area from the vertex d to the vertex a. In this manner, the second embodiment is employed when the processing module 26 located at the corner of the conference room profile as the output destination is registered.

In other words, when the processing module 26 as the output destination is present with respect to the vertexes a, b, c, d and the sides ab, bc, cd, da, the output destination ID is recited after a punctuation mark ": (colon)", and the next vertex or side is recited after a punctuation mark "; (semicolon)". In contrast, when the processing module 26 as the output destination is not present, the next vertex or side is recited immediately after a punctuation mark "; (semicolon)".

Here, in the second embodiment, as the process of the equipment specifying module 104, i.e., the method of specifying the coordinate region every output destination from the registration information, a side is divided equally by the number of output destinations. A width of each coordinate region is set arbitrarily, but the width is set to a fixed length (e.g., 3 cm) in the present embodiment. Also, a size of the coordinate region at four corners is set arbitrarily similarly, but the size is fixed (e.g., 3 cm×3 cm) in the present embodiment. When the output destination is present at the corner, such output destination is assigned to the coordinate region at a corner. A schematic view of the coordinate region of the conference room D shown in FIG. 14D is shown in FIG. 26. In comparison with a schematic view of the coordinate region shown in FIG. 24D, the position of the output destination ID: o_id2 (the composite machine 112) can be correlated more closely with the position in the actual conference room.

Next, a third embodiment will be explained hereunder.

In the third embodiment, the registration information formed by the output destination registering module 21 (the registration information stored in the equipment/coordinate correspondence storing module 102) and the process of the equipment specifying module 104 for specifying the coordinate region every output destination based on the registration information are different from the first embodiment. These two respects will be explained mainly hereunder.

In the third embodiment, the registration information is formed by setting grid-like squares in the conference room profile, and correlating the processing module 26 as the output destination with the squares.

In the third embodiment, first the coordinate is set by dividing equally a width and a height of the conference room profile by N respectively. Where N is an integral number of 1 or more, but the case where N=10 is set is shown herein. Concretely, for example, the conference rooms E and F shown in FIGS. 14E and 14F that are illustrated on the coordinate that is divided equally by 10 respectively are shown in FIGS. 27A and 27B.

The registration information of the conference room E shown in FIG. 14E in the third embodiment is shown in FIG. 28.

The notation (3-5, 0-1): o_id1 indicates that the output destination ID (o_id1) is arranged in the position that is away by 5 from the X-coordinate 3 and away by 1 from the Y-coordinate 0. The position of the processing module 26 as each output destination is recited according to this notation method. This notation method is used when the rough size and the rough position of the processing module 26 as each output destination are registered.

The registration information of the conference room F shown in FIG. 14F in the third embodiment is shown in FIG. 29.

This registration information is used in such a case that, even though the output destination ID: (o_id3) and the output destination ID: (o_id4) have a large difference in profile when the actual conference room is approximated with the conference room profile, they are registered according to the relative positional relationship with the display (the output destination ID: (o_id1), the output destination ID:(o_id2)) positioned upward.

That is, the coordinate is used instead of the vertex and the side in the registration information in the second embodiment. The coordinate is designated by putting it in parentheses "( )", and the X coordinate and the Y coordinate are recited in order. Also, when the output destination spread over the coordinates, the coordinates are joined with a "-(hyphen)".

Figure 30A:
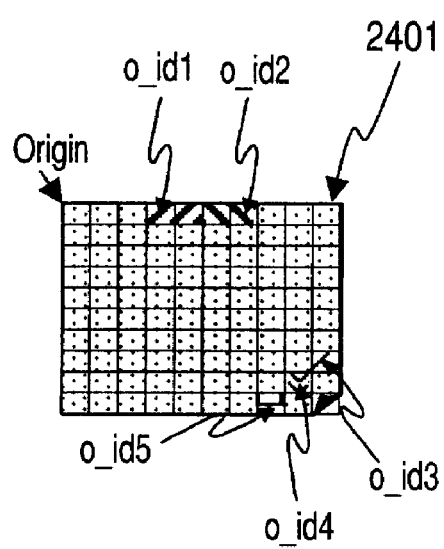
FIGS. 30A and 30B are explanatory views showing an example of the coordinate region of the conference rooms E and F.
Figure 30B:
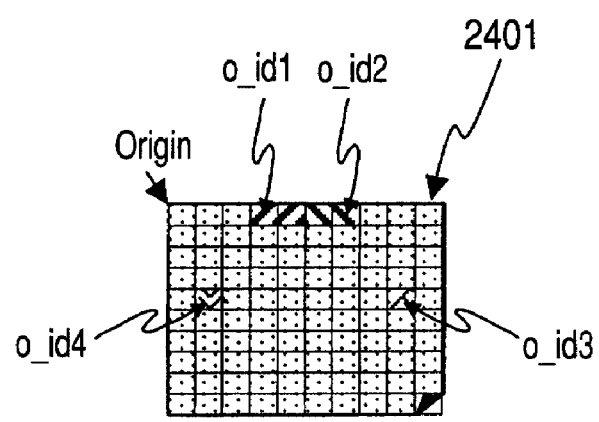

Here, in the third embodiment, in the process of the equipment specifying module 104, i.e., the method of specifying the coordinate region every output destination from the registration information, the coordinate whose height and width are divided equally by N is set on the document medium and the output destination is correlated according to the registration information. A schematic view of the coordinate region of the conference rooms E and F shown in FIGS. 14E and 14F is shown in FIGS. 30A and 30B.

In this case, in the above example, the coordinate on which the height and the width of the conference room profile are divided equally by N is set, but the height and the width of the conference room profile may be divided equally by different numbers respectively. Instead of the equal division, for example, the coordinate on which the processing modules as respective output destinations are shown may be divided into grids constituting larger squares.

Next, a fourth embodiment will be explained hereunder.

The fourth embodiment gives an example in which a special meaning is allotted to the coordinate information that the reading module 25 reads.

The fourth embodiment is different in the output destination registering module 21 and the output controlling module 22 from the foregoing first, second, third embodiments, and this respect will be explained hereunder.

Figure 31:
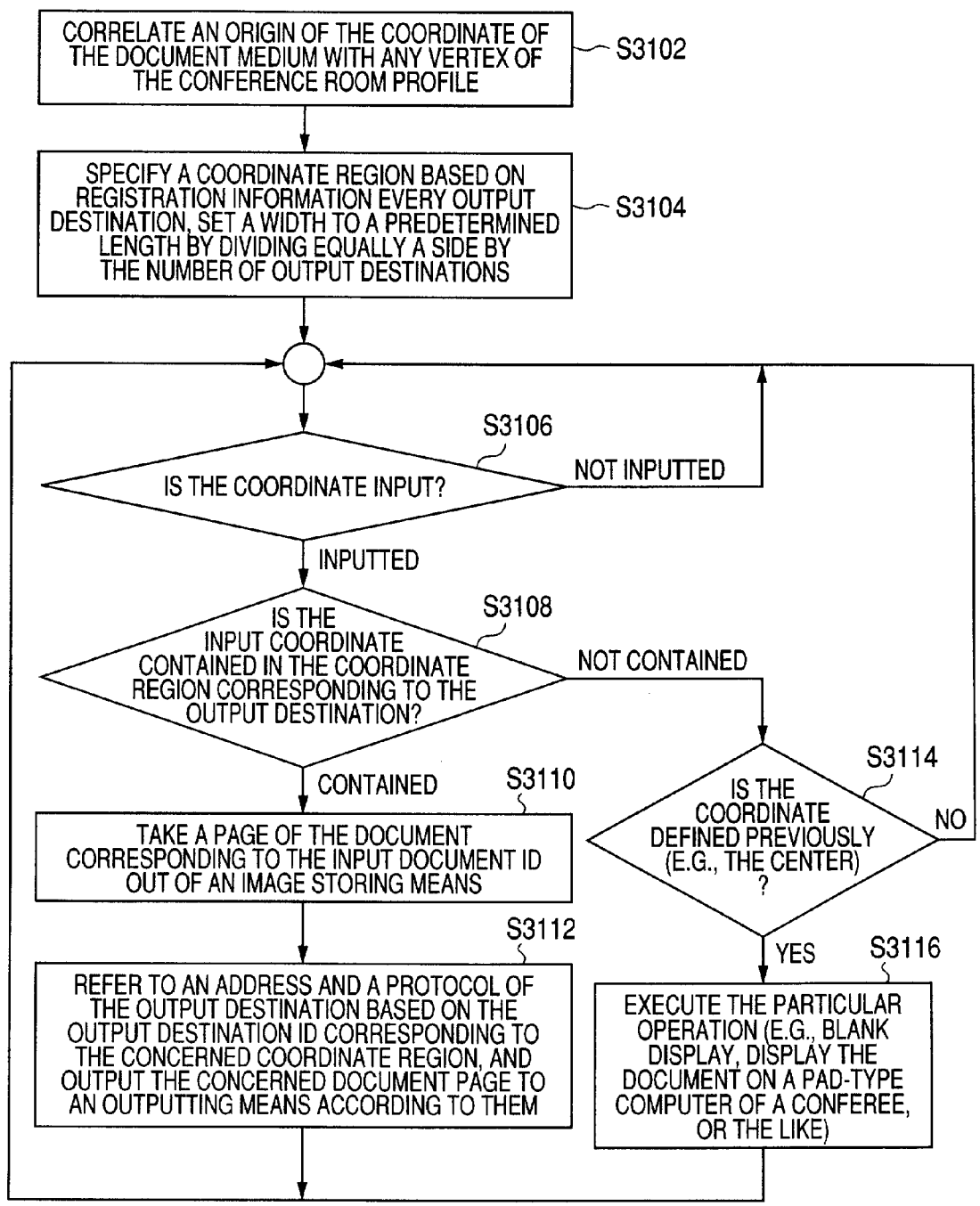
FIG. 31 is a flowchart showing a processed example of an output destination registering module.

A flowchart of an example of processes that the output destination registering module 21 executes is shown in FIG. 31.

In FIG. 31, the processes from step S3102 to step S3106 are similar to those from step S2202 to step S2206 in the flowchart shown in FIG. 22.

In step S3108, the process is similar to that in step S2208 in the flowchart shown in FIG. 22, but the process goes to step S3114 if the input coordinate is not contained in the coordinate region corresponding to the output destination.

The processes in step S3110 and step S3112 are similar to those from step S2210 to step S2212 in the flowchart shown in FIG. 22.

In step S3114, it is decided whether or not the input coordinate corresponds to the particular coordinate. The process goes to step S3116 if the input coordinate corresponds to the particular coordinate, while the process goes back to step S3106 if the input coordinate does not correspond to the particular coordinate.

Here, the particular coordinate means the coordinate that has been defined in advance by the output destination registering module 21. That is, not only the coordinate of the processing module 26 as the output destination, etc. but also the particular coordinate is contained in the registration information. Any notation may be employed if such notation can be distinguished from the coordinated, and the like. Also, the previously fixed coordinate may be used as the particular coordinate. As the particular coordinate, for example, the center and its neighborhood in which the processing module 26 as the output destination is hardly arranged, the right side of the center, the left side of the center, etc. may be employed.

In step S3116, the particular operation corresponding to the particular coordinate is executed.

Here, the particular operation means the operation that has been defined in advance by the output destination registering module 21. That is, the particular operation is also contained in the registration information to correlate with the particular coordinate. Any notation may be employed if such notation can be distinguished from the coordinated, and the like. Also, the previously fixed operation may be used as the particular operation. As the particular operation, there are various operations, for example, an UNDO operation (to put a state back in its state just prior to the process by canceling the process executed precedingly), a blank display operation, an operation of displaying the present displayed image on the pad-type computer of the conferee, an operation of switching the material being displayed to a previous page or a next page, etc.

For example, in case the operator display the wrong output destination by mistake, or the like in such a situation that the center and its neighborhood is set as the particular coordinate and UNDO is set as the particular operation, the UNDO operation is used to restore the state to its original state when the center and its neighborhood is pointed by the operation of the operator.

Figure 32:
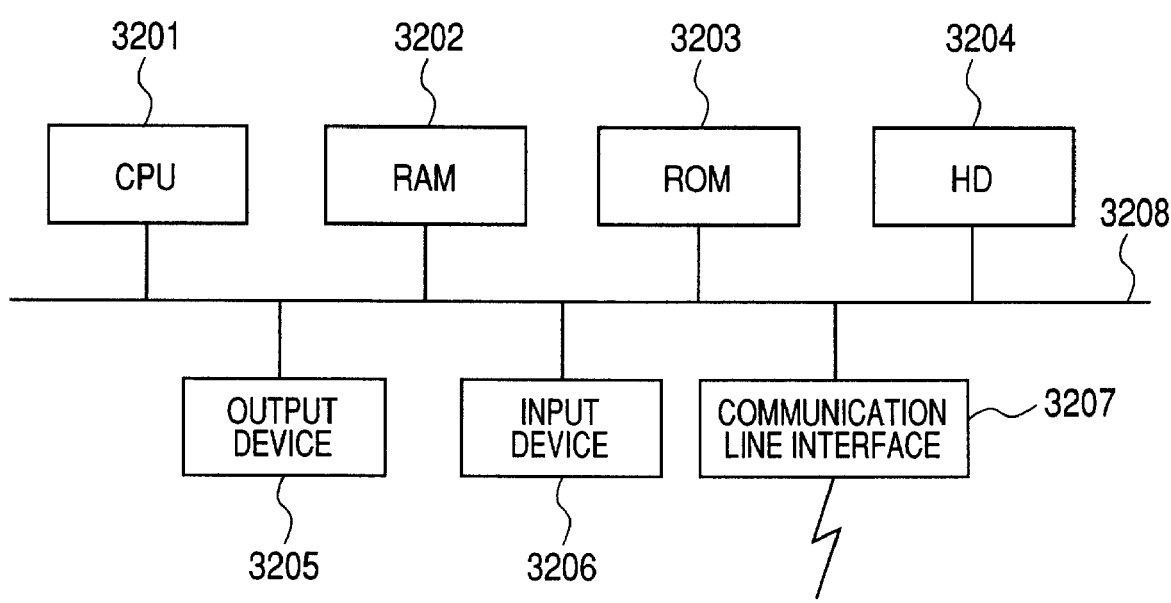
FIG. 32 is a block diagram showing a hardware configurative example of a computer that accomplishes the present embodiment.

As shown in FIG. 32, a hardware configuration of a computer by which programs of the output destination registering module 21, the output controlling module 22, the document image forming module 23, the image storing module 24, the reading module 25 as the tablet-type PC, and the like are executed is constructed by an ordinary computer. Concretely, such hardware configuration is given by the personal computer, the pad-type computer, the computer acting as the server, and the like. The hardware configuration is constructed by a CPU 3201 for executing the programs for the document ID generating module 31, the document ID/coordinate image generating module 32, the document data generating module 33, the displayed document changing module 82, the document data extracting module 101, the equipment specifying module 104, etc.; a RAM 3202 for storing the programs and data; a ROM 3203 in which the program for starting the present computer, and the like are stored; a HD 3204 as an auxiliary memory device (e.g., the hard disk can be used); an input device 3206 such as a keyboard, a mouse, etc. for inputting the data; an output device 3205 such as the CRT, the liquid crystal display, or the like; a communication line interface 3207 for establishing the connection to the communication network (e.g., the network interface card can be used); and a bus 3208 for connecting these equipments to transfer the data mutually. Also, a plurality of computers explained above may be connected via the network.

Out of the foregoing embodiment, the concerned portion that is implemented by the computer program can be realized by reading the computer program as the software into the system having the present hardware configuration such that the software cooperates with the hardware resource.

Here, the hardware configuration shown in FIG. 32 shows one configurative example. But the present embodiment is not restricted to the configuration shown in FIG. 32, and any configuration may be employed if such configuration can implement respective modules explained in the present embodiment. For example, a part of modules maybe constructed by a dedicated hardware (e.g., ASIC, or the like), and also a part of modules may be shared with the external system that is connected via the communication line. Also, a plurality of systems shown in FIG. 32 may be connected mutually via the communication line to take cooperative actions mutually. Also, the present embodiment may be incorporated into the information home appliances, the copying machine, the facsimile, the scanner, the printer, the composite machine, etc. in addition to the personal computer.

In the above embodiment, the composite machine 13 is illustrated to print the paper document such as the paper document 14A with the ID and the coordinate, or the like. But the present embodiment maybe applied to the printer, the facsimile, the writing device for an electronic paper, and the like.

Also, the technology made by Anoto Group AB (see, e.g., the Anoto website) may be employed as the information image. This technology embeds a two-dimensional code that gives positional information on a paper sheet in the paper. And, when the pen-type scanner reads the two-dimensional code composed of a dot pattern printed on a paper sheet, such pen-type scanner senses the position of a pen on a paper sheet and then stores digitized written loci in the pen.

The program explained above may be stored in the recording medium and then provided. Also, this program may be provided via the communicating means. In such case, for example, the program explained above can be grasped as the invention of the "computer-readable recording medium for recording the program".

The "computer-readable recording medium for recording the program" means the computer-readable recording medium that records the program and is used to install, run, distribute, and the like the program.

As the recording medium, for example, digital versatile disc (DVD) such as "DVD-R, DVD-RW, DVD-RAM, etc." as the standard decided in the DVD forum, "DVD+R, DVD+RW, etc." as the standard decided in the DVD+RW, and the like, compact disk (CD) such as the compact disc read only memory (CD-ROM), the compact disc-recordable (CD-R) the compact disc-rewritable (CD-RW), and the like, magneto-optics disc (MO), flexible disk (FD), magnetic tape, hard disk, read only memory (ROM), electrically erasable and programmable read only memory (EEPROM), flash memory, random access memory (RAM), and others are contained.

Also, the above program or a part of the program may be recorded in the recording medium to save, distribute, and the like. Also, the program may be transmitted by the communication via the transmission medium, for example, the cable network such as local area network (LAN), metropolitan area network (MAN), wide area network (WAN), Internet, intranet, extranet, or the like, the radio communication network, and their combination. Also, the program may be carried via the carrier wave.

In addition, the above program may be constructed as a part of other program, or may be recorded on the recording medium together with other programs. Also, the above program may be split and recorded on plural recording media. Also, the above program may be recorded in any mode such as a compressed mode, a encrypted mode, or the like if such program can be restored.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An information processing system comprising:
a reading unit that reads an information image recited on the paper document;
a room specifying unit that specifies a room based on the reading unit;
an equipment coordinate storing unit that stores a correspondence between the room and a placing location of an information processing equipment equipped in the room;
a document specifying unit that, using at least one central processing unit (CPU), extracts a document identifier to specify a paper document on the basis of the information image read by the reading unit;
a coordinate information extracting unit that, using at least one central processing unit (CPU), extracts coordinate information on the basis of the information image read by the reading unit;
a document information extracting unit that, using at least one central processing unit (CPU), extracts document information regarding the paper document on the basis of the document identifier specified by the document specifying unit;
an equipment specifying unit that specifies the information processing equipment stored in the equipment coordinate storing unit on the basis of room information specified by the room specifying unit and the coordinate information extracted by the coordinate information extracting unit;
an outputting unit that outputs the document information extracted by the document information extracting unit to the information processing equipment specified by the equipment specifying unit;
an identifier generating unit that generates a document identifier used to specify a document;
an information image generating unit that generates an information image in response to the document identifier generated by the identifier generating unit and coordinate information;
an image synthesizing unit that synthesizes document information regarding the document specified by the document identifier and the information image generated by the information image generating unit; and
an image outputting unit that outputs an image synthesized by the image synthesizing unit onto the paper document, wherein
the document specifying unit specifies the paper document by extracting the document identifier from the paper document output by the image outputting unit, and
the coordinate information extracting unit extracts the coordinate information from the paper document output by the image outputting unit.

2. The information processing system as claimed in claim 1, wherein the equipment coordinate storing unit stores a correspondence between the placing location of the information processing equipment in the room and the coordinate information.

3. The information processing system as claimed in claim 1, further comprising:
a document storing unit that stores the document information specified by using the document identifier; and
an information processing equipment that receives the document information output by the outputting unit and processing the document information,
wherein
the document information extracting unit extracts the document information stored in the document storing unit in response to the document identifier.

4. The information processing system as claimed in claim 1,
wherein
the equipment coordinate storing unit stores further a correspondence between the coordinate information and an operation in the information processing equipment,
the document specifying unit extracts the operation in the information processing equipment stored in the equipment coordinate storing unit corresponding to the coordinate information, and
the outputting unit outputs the operation extracted by the equipment specifying unit to the information processing equipment.

5. An information processing method comprising:
controlling a reading module to read an information image recited on a paper document;
specifying a room based on the reading module;
storing a correspondence between the room and a placing location of an information processing equipment equipped in the room;
extracting, using at least one central processing unit (CPU), a document identifier to specify the paper document on the basis of the information image read by the reading module;
extracting, using at least one central processing unit (CPU), coordinate information on the basis of the information image read by the reading module;
extracting, using at least one central processing unit (CPU), document information regarding the paper document on the basis of the extracted document identifier;
specifying the information processing equipment stored in the correspondence based on the specified room and the extracted coordinate information;
outputting the extracted document information to the specified information processing equipment;
generating a document identifier used to specify a document;
generating an information image in response to the generated document identifier and coordinate information;
synthesizing document information regarding the document specified by the document identifier and the generated information image to generate a synthesized image; and
outputting the synthesized image onto the paper document, wherein
the extracting the document identifier comprises specifying the paper document by extracting the document identifier from the output paper document, and
the extracting the coordinate information comprises extracting the coordinate information from the output paper document.

6. A computer readable storage medium storing a program causing a computer to execute a process for performing an information processing, the process comprising:
controlling a reading module to read an information image recited on a paper document;
specifying a room based on the reading module;
storing a correspondence between the room and a placing location of an information processing equipment equipped in the room;
extracting, using at least one central processing unit (CPU), a document identifier to specify the paper document on the basis of the information image read by the reading module;
extracting, using at least one central processing unit (CPU), coordinate information on the basis of the information image read by the reading module;
extracting, using at least one central processing unit (CPU), document information regarding the paper document on the basis of the extracted document identifier;
specifying the information processing equipment stored in the correspondence based on the specified room and the extracted coordinate information;
outputting the extracted document information to the specified information processing equipment;
generating a document identifier used to specify a document;
generating an information image in response to the generated document identifier and coordinate information;
synthesizing document information regarding the document specified by the document identifier and the generated information image to generate a synthesized image; and
outputting the synthesized image onto the paper document, wherein
the extracting the document identifier comprises specifying the paper document by extracting the document identifier from the output paper document, and
the extracting the coordinate information comprises extracting the coordinate information from the output paper document.

7. A room-based document processing system for processing documents within a room having a plurality of information processing equipment located therein, the room-based document processing system comprising:
a pen-type scanner that reads a bit pattern image that is printed at a specific location on a document;
an identifier and coordinate extracting module that extracts, using at least one central processing unit (CPU), from the bit pattern image, a document identifier (ID) of the document and location information that indicates the specific location of the bit pattern image on the document; and
an output controlling module that outputs document data identified by the document ID to an information processing equipment of the plurality of information processing equipment within the room based on the location information,
wherein the room is mapped to the document, and a location within the room of the information processing equipment to which the document data is output corresponds to the specific location of the bit pattern image on the document,
wherein coordinates of the room are mapped to coordinates of the document, and an origin point of the room corresponds to an origin point of the document,
the location information indicates coordinates of the specific location of the bit pattern image on the document relative to the original point on the document, and
the location of the information processing equipment to which the document data is output indicates coordinates of the information processing equipment relative to the original point of the room.

8. An information processing system comprising:
a reading module that reads an information image provided on a document;
a room specifying module that specifies a room with which the reading unit is associated;
an identifier (ID) extracting module that extracts, using at least one central processing unit (CPU), from the information image read by the reading module, a document identifier corresponding to the document;
a coordinate extracting module that extracts, using at least one central processing unit (CPU), coordinate information from the information image read by the reading module, the coordinate information indicating a location of the information image on the document;
a document data extracting module that retrieves, using at least one central processing unit (CPU), document data corresponding to the document identifier extracted by the ID extracting module;
an equipment specifying module that specifies an information processing equipment based on the room specified by the room specifying module and the coordinate information extracted by the coordinate extracting module;
an outputting module that outputs, using at least one central processing unit (CPU), the document data to the information processing equipment specified by the equipment specifying module;
a document identifier (ID) generating module that generates a document identifier used to identify a document;
a document identifier (ID) and coordinate image generating module that generates an information image including the document identifier generated by the identifier generating module and coordinate information indicating a coordinate on the document at which the information image will be recorded;
an image synthesizing module that synthesizes document data corresponding to the document specified by the document identifier and the information image generated by the document ID and coordinate image generating module into an image; and
a printing module that outputs the image synthesized by the image synthesizing module onto the document,
wherein the ID extracting module extracts the document identifier from the document output by the printing module, and
the coordinate extracting module extracts the coordinate information from the document output by the printing module.

9. The information processing system as claimed in claim 8, further comprising:
an equipment coordinate correspondence storing module that stores a correspondence between a location of the information processing equipment in the room and the coordinate information,
wherein the equipment specifying module specifies the information processing equipment by looking up the information processing equipment that corresponds to the coordinate information.

10. The information processing system as claimed in claim 8, further comprising:
a document data storing module that stores document data and document identifiers that specify the document data,
wherein the information processing equipment receives the document data output by the outputting unit and processes the document data, and
the document data extracting module extracts the document data stored in the document storing unit based on the document identifier.

11. An information processing system comprising:
a reading module that reads an information image provided on a document;
a room specifying module that specifies a room with which the reading unit is associated;
an identifier (ID) extracting module that extracts, using at least one central processing unit (CPU), from the information image read by the reading module, a document identifier corresponding to the document;
a coordinate extracting module that extracts, using at least one central processing unit (CPU), coordinate information from the information image read by the reading module, the coordinate information indicating a location of the information image on the document;
a document data extracting module that retrieves, using at least one central processing unit (CPU), document data corresponding to the document identifier extracted by the ID extracting module;
an equipment specifying module that specifies an information processing equipment based on the room specified by the room specifying module and the coordinate information extracted by the coordinate extracting module;
an outputting module that outputs, using at least one central processing unit (CPU), the document data to the information processing equipment specified by the equipment specifying module; and
an equipment coordinate correspondence storing module that stores a correspondence between a location of the information processing equipment in the room and the coordinate information,
wherein the equipment specifying module specifies the information processing equipment by looking up the information processing equipment that corresponds to the coordinate information,
wherein:
the equipment coordinate storing module stores further a correspondence between the coordinate information and an operation to be performed by the information processing equipment,
the identifier (ID) extracting module extracts the operation stored in the equipment coordinate storing module corresponding to the coordinate information, and
the outputting unit outputs information indicating the operation extracted by the identifier (ID) extracting module to the information processing equipment.

* * * * *